(12) United States Patent
Schrader

(10) Patent No.: US 11,976,744 B2
(45) Date of Patent: May 7, 2024

(54) SYSTEM AND METHODS FOR OPERATING A SOLENOID VALVE

(71) Applicant: Capstan Ag Systems, Inc., Topeka, KS (US)

(72) Inventor: Kale Schrader, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 0 days.

(21) Appl. No.: 17/303,641

(22) Filed: Jun. 3, 2021

(65) Prior Publication Data

US 2021/0381617 A1    Dec. 9, 2021

Related U.S. Application Data

(60) Provisional application No. 62/704,932, filed on Jun. 3, 2020.

(51) Int. Cl.
    *F16K 31/06*      (2006.01)
    *H01F 7/18*      (2006.01)
    *A01C 23/00*      (2006.01)

(52) U.S. Cl.
    CPC ....... *F16K 31/0679* (2013.01); *H01F 7/1816* (2013.01); *A01C 23/007* (2013.01); *H01F 2007/1822* (2013.01); *H01F 2007/1888* (2013.01)

(58) Field of Classification Search
    CPC ............. F16K 31/0679; F16K 31/0672; F16K 31/0675; H01F 7/1816; H01F 7/1883; H01F 2007/1822; H01F 2007/1888; A01C 23/007
See application file for complete search history.

(56) References Cited

U.S. PATENT DOCUMENTS

| 4,227,231 A | 10/1980 | Hansen et al. |
| 4,590,576 A | 5/1986 | Elpiner |
| 4,661,766 A | 4/1987 | Hoffman et al. |

(Continued)

FOREIGN PATENT DOCUMENTS

| CN | 105569859 A | 5/2016 |
| DE | 10359272 A1 | 7/2004 |

(Continued)

OTHER PUBLICATIONS

International Preliminary Report on Patentability issued in International Patent Application No. PCT/US2021/035706, dated Aug. 22, 2022, 11 pages.

(Continued)

*Primary Examiner* — Matthew W Jellett
(74) *Attorney, Agent, or Firm* — Armstrong Teasdale LLP

(57) ABSTRACT

A drive circuit for controlling a solenoid valve having a solenoid coil and a poppet that translates therein is provided. The drive circuit includes a supply bus, a return bus, a flyback circuit, and a switch. The supply bus is configured to couple the solenoid coil to a power supply and supply a coil current. The return bus is configured to provide a ground path for the coil current. The flyback circuit is coupled in parallel to only the solenoid coil. The flyback circuit includes only a bipolar diode. The switch is coupled in series with the solenoid coil and configured to couple and decouple the solenoid coil to the return bus.

21 Claims, 12 Drawing Sheets

(56) References Cited

U.S. PATENT DOCUMENTS

| | | | |
|---|---|---|---|
| 4,729,056 A | | 3/1988 | Edwards et al. |
| 4,967,309 A | | 10/1990 | Hoffman |
| 5,052,174 A | | 10/1991 | Bak |
| 5,134,961 A | | 8/1992 | Giles et al. |
| 5,324,359 A | | 6/1994 | Cleveland et al. |
| 5,499,157 A | | 3/1996 | Younessi et al. |
| 5,574,617 A | | 11/1996 | Shimanuki |
| 5,647,387 A | | 7/1997 | Tsutsui |
| 5,653,389 A | | 8/1997 | Henderson et al. |
| 5,704,546 A | | 1/1998 | Henderson et al. |
| 5,881,919 A | | 3/1999 | Womac et al. |
| 5,908,161 A | | 6/1999 | Womac et al. |
| 5,967,066 A | | 10/1999 | Giles et al. |
| 6,019,347 A | | 2/2000 | Adams et al. |
| 6,050,281 A | | 4/2000 | Adams |
| 6,123,092 A | * | 9/2000 | Torii .................. F02M 51/061 251/129.01 |
| 6,302,080 B1 | | 10/2001 | Kato et al. |
| 6,324,046 B1 | | 11/2001 | Kadah |
| 6,374,624 B1 | | 4/2002 | Cholkeri et al. |
| 6,493,204 B1 | | 12/2002 | Glidden et al. |
| 7,311,004 B2 | | 12/2007 | Giles |
| 7,502,665 B2 | | 3/2009 | Giles et al. |
| 7,742,842 B2 | | 6/2010 | Giles et al. |
| 7,826,930 B2 | | 11/2010 | Giles et al. |
| 7,881,035 B2 | | 2/2011 | Takahashi |
| 8,059,382 B2 | * | 11/2011 | Schmidt ................ H01F 7/1805 361/160 |
| 8,191,795 B2 | | 6/2012 | Grimm et al. |
| 8,830,649 B2 | * | 9/2014 | Oppermann .......... H01F 7/1811 361/152 |
| 9,435,458 B2 | | 9/2016 | Needham et al. |
| 9,528,625 B2 | * | 12/2016 | Schweikert ......... F16K 31/0675 |
| 9,635,848 B2 | | 5/2017 | Needham et al. |
| 10,441,965 B2 | | 10/2019 | Feldhaus et al. |
| 10,522,313 B2 | * | 12/2019 | Mecklenburg .......... H01F 7/122 |
| 10,773,271 B2 | | 9/2020 | Funseth |
| 10,773,721 B2 | | 9/2020 | Buss |
| 2003/0165038 A1 | | 9/2003 | Ahrendt |
| 2004/0057183 A1 | | 3/2004 | Vincent |
| 2004/0196092 A1 | * | 10/2004 | Tojo ........................ F02D 41/20 361/139 |
| 2005/0279299 A1 | | 12/2005 | Degner |
| 2005/0279780 A1 | | 12/2005 | Evans et al. |
| 2006/0102234 A1 | | 5/2006 | Meisel |
| 2006/0151544 A1 | | 7/2006 | Greenwald et al. |
| 2006/0225489 A1 | | 10/2006 | Giles et al. |
| 2006/0265106 A1 | | 11/2006 | Giles et al. |
| 2006/0273189 A1 | | 12/2006 | Grimm et al. |
| 2007/0188967 A1 | | 8/2007 | Smith et al. |
| 2008/0230624 A1 | | 9/2008 | Giles et al. |
| 2008/0319584 A1 | * | 12/2008 | Fischer .................. F02D 41/20 700/282 |
| 2009/0108849 A1 | | 4/2009 | Berg et al. |
| 2009/0213519 A1 | | 8/2009 | Bedingfield |
| 2009/0309054 A1 | | 12/2009 | Haller et al. |
| 2009/0323246 A1 | | 12/2009 | Brenner |
| 2010/0032492 A1 | | 2/2010 | Grimm et al. |
| 2010/0259861 A1 | | 10/2010 | Wendt |
| 2012/0228395 A1 | | 9/2012 | Needham et al. |
| 2013/0027833 A1 | | 1/2013 | Rabe et al. |
| 2014/0299673 A1 | | 10/2014 | Grimm et al. |
| 2015/0246369 A1 | | 9/2015 | Sykes et al. |
| 2015/0300522 A1 | | 10/2015 | Ito et al. |
| 2015/0367357 A1 | | 12/2015 | Humpal et al. |
| 2015/0367358 A1 | | 12/2015 | Funseth et al. |
| 2015/0375247 A1 | | 12/2015 | Funseth |
| 2016/0203931 A1 | | 7/2016 | Ramsey |
| 2016/0265811 A1 | | 9/2016 | Furmanek et al. |
| 2017/0012063 A1 | | 1/2017 | Kwak |
| 2017/0120263 A1 | | 5/2017 | Needham |
| 2017/0122268 A1 | | 5/2017 | Hashimoto |
| 2017/0284556 A1 | | 10/2017 | Omekanda et al. |
| 2019/0040972 A1 | | 2/2019 | Schrader |
| 2020/0096019 A1 | | 3/2020 | Schrader et al. |
| 2021/0048117 A1 | | 2/2021 | Schrader |

FOREIGN PATENT DOCUMENTS

| | | | |
|---|---|---|---|
| DE | 102009006179 | A1 | 7/2010 |
| EP | 1260694 | A2 | 11/2002 |
| EP | 1346637 | A1 | 9/2003 |
| EP | 2165770 | A1 | 3/2010 |
| WO | 2001010692 | A1 | 2/2001 |
| WO | 2008048550 | A2 | 4/2008 |

OTHER PUBLICATIONS

Second Written Opinion of the International Preliminary Examining Authority issued in International Patent Application No. PCT/US2021/035706, dated Apr. 28, 2022, 9 pages.

International Search Report and Written Opinion for International Application No. PCT/US2021/035706, dated Oct. 6, 2021, 30 pages.

Written Opinion of the International Preliminary Examining Authority in connection with International Application No. PCT/US2018/045160, dated Jun. 28, 2019, 5 pages.

Extended European Search Report issued in European Patent Application No. 22189566.7, dated Jan. 12, 2022, 6 pages.

International Search Report and Written Opinion in related International Application PCT/US2018/045160, dated Nov. 21, 2018, 13 pages.

International Preliminary Report on Patentability issued from the International Preliminary Examining Authority in connection with International Application No. PCT/US2018/045160, dated Oct. 15, 2019, 7 pages.

* cited by examiner

SYSTEM AND METHODS FOR OPERATING A SOLENOID VALVE

CROSS-REFERENCE TO RELATED APPLICATIONS

This application claims priority to U.S. Provisional Patent Application Ser. No. 62/704,932, filed on Jun. 3, 2020, the disclosure of which is hereby incorporated by reference in its entirety.

BACKGROUND

The present disclosure relates generally to fluid distribution systems and, more particularly, to control systems for operating fluid dispensing valves and methods of use.

In agricultural spraying, precise control of fluid flow through a valve is an important factor in delivering a specified amount of agrochemical to a specified area. Most agrochemicals such as crop protection agents and many fertilizers are applied as liquid solutions, suspensions, and emulsions that are sprayed onto the target fields. Certain agrochemicals, such as anhydrous ammonia, are dispensed into soil through dispensing tubes positioned behind knives or plows that prepare the soil for application.

Typically, the agrochemical liquid is supplied by powered pumps to simple or complex orifice nozzles that atomize the liquid stream into spray droplets. Nozzles are often selected primarily on the desired range of flow rates needed for the job and secondarily on the range of liquid droplet size spectra and spray distribution patterns they produce.

Increasing concerns over inefficient agrochemical use, the cost of agrochemicals and inadvertent spray drift or pesticide run-off have resulted in attempts to improve the quality, precision, accuracy and reliability of application of agrochemicals. This has led to increased use of electronic control systems and individual control of spray nozzles or nozzle assemblies through use of solenoid valves. Consequently, the power necessary to operate the solenoid valves increases as the number of valves and size of the system increase. Moreover, as fluid flow per valve increases, the necessary power increases further. At some point, the total power approaches limits of the electrical system, its components, and its conductors, e.g., wiring.

Solenoid valves generally include a solenoid coil, or winding, within which a poppet translates to open and close an orifice. Typically, the poppet is biased by a spring to the closed position. In operation, a current is supplied to the coil to generate a magnetic field that induces a force on the poppet. The force on the poppet generally results in the solenoid valve's opening or holding a position, against forces supplied by the spring and the pressure of fluid dispensed through the valve. Closing of the valve is generally achieved by the spring forces overcoming the force generated by the solenoid coil. Solenoid valves in sprayer systems are typically operated to deliver an on/off pattern or a pulse width modulation (PWM) pattern of fluid through a given valve and nozzle assembly. Under ideal conditions, a PWM fluid delivery pattern would match a PWM control signal in pulse width and duty cycle, implying an instantaneous opening and closing of the valve. However, opening or closing of a solenoid valve is not instantaneous due to inertia, fluid drag, poppet friction, material properties, and inherent electrical characteristics of the solenoid coil. At least some delay in a solenoid valve is due to the time-varying current relationship for a given voltage applied to an inductive coil, such as the solenoid coil, i.e. $V/L=\delta i/\delta t$. In other words, time is required to increase current conducted through the solenoid coil, i.e., coil current, to a level sufficient to generate the force necessary to control movement of the poppet.

In practice, such electrical characteristics skew the operational pulse width and duty cycle with which the solenoid valve operates with respect to an electrical pulse width and duty cycle that controls the solenoid valve. Likewise, the skew applies to the application of fluid itself.

Thus, a need currently exists for a system and process for rapid, precise, and predictable opening and closing of solenoid valves. Such a system and process is well suited for use in the agricultural field. It should be understood, however, that similar needs also exist in other fields. For example, on irrigation systems, in industrial spray driers, and in spray humidification or cooling systems. Specifically, a system that provides rapid and precise opening and closing of solenoid valves may find wide applicability in any system, whether commercial, industrial or residential, that utilizes solenoid valves.

BRIEF DESCRIPTION

In one aspect, a drive circuit for controlling a solenoid valve having a solenoid coil and a poppet that translates therein is provided. The drive circuit includes a supply bus, a return bus, a flyback circuit, and a switch. The supply bus is configured to couple the solenoid coil to a power supply and supply a coil current. The return bus is configured to provide a ground path for the coil current. The flyback circuit is coupled in parallel to only the solenoid coil. The flyback circuit includes only a bipolar diode. The switch is coupled in series with the solenoid coil and configured to couple and decouple the solenoid coil to the return bus.

In another aspect, a drive circuit for controlling a plurality of solenoid valves having respective solenoid coils and respective poppets configured to translate therein is provided. The drive circuit includes a supply bus, respective return buses, respective bipolar diodes, and respective switches. The supply bus is configured to couple the respective solenoid coils to a power supply and supply respective coil currents. The respective return buses are configured to provide a ground path for the respective coil currents. The respective bipolar diodes are coupled in parallel to the respective solenoid coils. The respective switches are coupled in series with the respective solenoid coils and configured to couple and decouple the respective solenoid coils to the respective return buses.

In yet another aspect, a method of controlling a solenoid valve is provided. The solenoid valve includes a solenoid coil and a poppet configured to translate therein. The method includes supplying a voltage to the solenoid coil over a supply bus. The method includes coupling the solenoid coil to a ground path over a return bus to translate the poppet to an opened position. The method includes decoupling the solenoid coil from the ground path to translate the poppet to a closed position. The method includes directing a flyback current sourced from the solenoid coil through a flyback circuit coupled in parallel to only the solenoid coil, the flyback circuit including only a bipolar diode.

In yet another aspect, a drive circuit for controlling a first solenoid valve having a first solenoid coil and a second solenoid valve having a second solenoid coil is provided. The drive circuit includes a low voltage bus, a high voltage bus, a control circuit, a flyback circuit, and a charge pump circuit. The low voltage bus is configured to be energized by a power source. The control circuit is coupled to the low voltage bus and the high voltage bus. The control circuit is configured to selectively couple the low voltage bus and the high voltage bus to the first and second solenoid coils using a shared power bus. The control circuit is further configured to periodically energize each of the first and second solenoid coils using respective pulse-width-modulated (PWM) signals, each having a frequency and a duty cycle configured to regulate a current conducted through the corresponding solenoid coil. The flyback circuit is coupled to the first and second solenoid coils and configured to energize the high voltage bus with energy stored in the first and second solenoid coils. The charge pump circuit includes a capacitor bank and a plurality of semiconductor switches. The plurality of semiconductor switches is configured to change a reference of the capacitor bank to charge the capacitor bank through the first and second solenoid coils, and discharge the capacitor bank to the high voltage bus.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

Corresponding reference characters indicate corresponding parts throughout the several views of the drawings.

DETAILED DESCRIPTION

Figure 1:
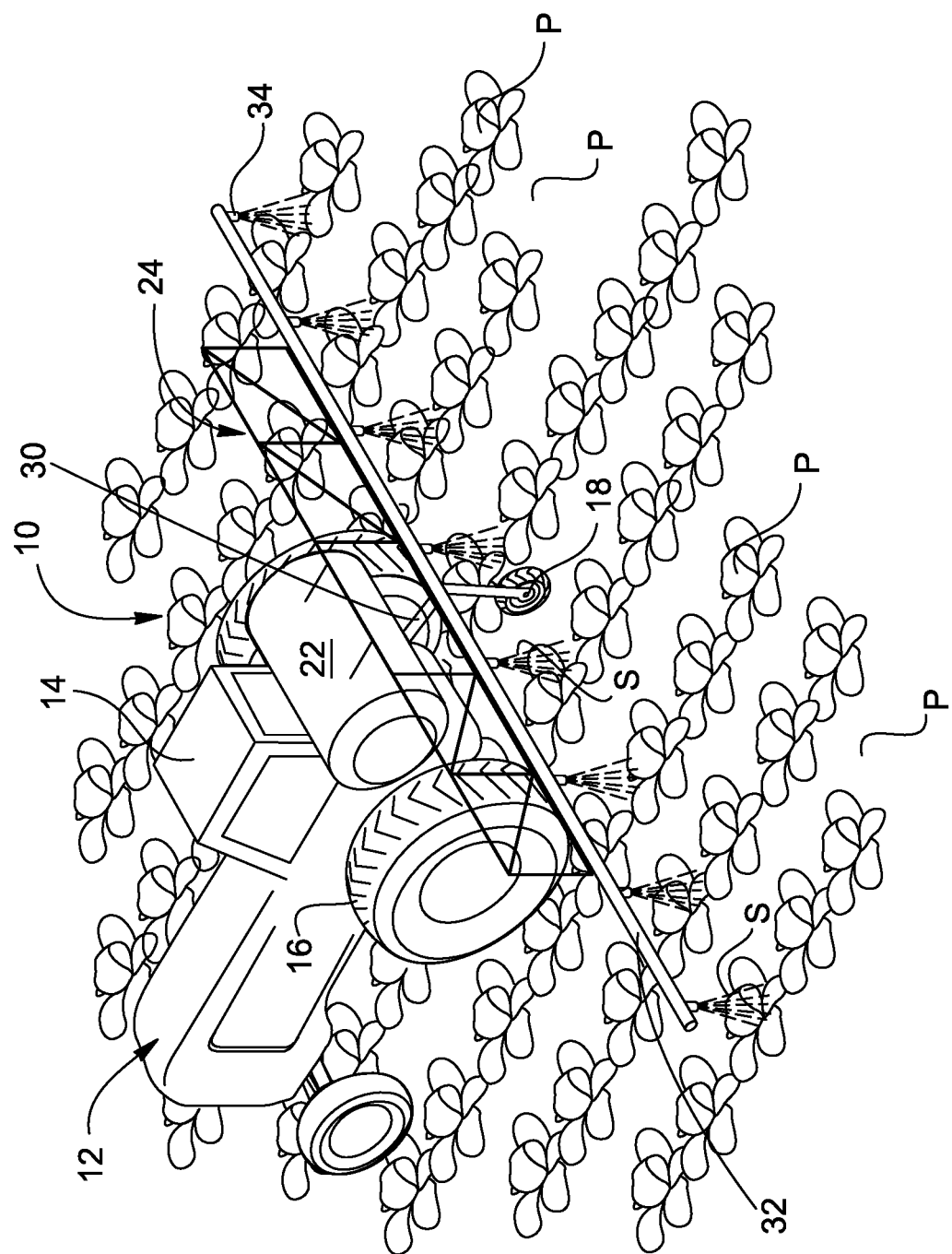
FIG. 1 is a perspective view of one embodiment of an agricultural spray system.

Generally, the time delays resulting from electrical characteristics and fluid pressure in opening a solenoid valve may be reduced by increasing operating voltage of the solenoid valve. For example, in agricultural spray systems, the operating voltage of solenoid valves may be increased from 12 Volt direct current (DC) to 24 Volt DC. However, 24 Volt DC is typically unavailable on agricultural equipment. Moreover, increasing to 24 Volt DC would increase power dissipation by the solenoid coil, and would potentially exceed electrical ratings for the solenoid coil itself, wiring, or other electrical components on a given agricultural spray system.

Generally, the required force to actuate a valve is at its peak when translating the poppet from the closed position to the open position, which is when the combined countervailing forces of the fluid pressure, a spring pre-loading of the poppet, and the electromotive force on the poppet are at their peak. More specifically, spring forces on the poppet increase as the spring is compressed with translation toward the opened position, but fluid pressure across the valve drops significantly when the poppet translates from the closed position. Conversely, the required force for holding the poppet in an opened position is significantly reduced from that necessary to open the solenoid valve. When in the opened position, for example, the proximity of the magnetic core of the solenoid valve to the poppet results in a more-efficient flux transfer and a greater force applied to the poppet for a given current supplied to the solenoid coil. Accordingly, the operating voltage of the solenoid valve may be increased momentarily when opening the solenoid valve to reduce the turn-on time delay, thereby reducing the time necessary to reach a coil current sufficient to translate the poppet to the open position. Alternatively, the momentarily increased solenoid voltage may be utilized to produce a momentary increase in current conducted through the solenoid coil over the nominal operating current for the coil, thereby increasing the fluid pressure against which the valve may open. Further, the coil current may be reduced when holding the poppet in the opened or closed state to conserve power.

Given that agricultural equipment typically lack, for example, a 24 Volt DC power source, an additional power source is needed for generating the momentarily increased voltage. Such a power source, in certain circumstances, may be an additional battery or power supply. In many agricultural spray systems, it may be preferred to provide a converter circuit for generating, for example, the 24 Volt DC power from a 12 Volt DC source. However, the cost and added complexity, size, and weight of converter circuits, including, for example, a switching boost converter, may be prohibitive.

A typical switching boost converter includes an inductive coil that, when energized with a PWM current signal at a low voltage, stores an electromagnetic field that, when current amplitude is reduced, generates a flyback voltage across the inductive coil that is captured and used to energize a bus at a high voltage. In some embodiments of the systems and methods described herein, a switching boost converter circuit may be constructed utilizing a solenoid coil of a solenoid valve as the necessary inductive coil. Further, in certain embodiments, a drive circuit for controlling such a solenoid valve may include various other components, in addition to the inductive coil, necessary for constructing the switching boost converter. The inductive coil of the switching boost converter is typically the most expensive, largest, and heaviest component in the device. As power requirements increase, the size and cost of the inductive coils tend to increase as well.

In certain embodiments, the increased voltage is provided by a charge pump circuit. More specifically, a circuit having semiconductor switches that control charging and discharging, and referencing of one or more capacitors. For example, the semiconductor switches are configured, or commutated, to connect the one or more capacitors across a power supply to charge the capacitors, and connect the one or more capacitors in series with the power supply and one or more solenoid coil to momentarily increase the voltage applied across the solenoid coil and discharge the capacitors.

In at least some embodiments, one or more capacitors may be coupled in parallel, or banked, and shared among two or more solenoid valves or groups of solenoid valves. For example, where one or more solenoid valves are grouped, or "ganged," a single bank of capacitors may be utilized for the charge pump circuits for two or more groups of solenoid valves. In such embodiments, each group of solenoid valves is actuated out of phase from each other. For example, in an embodiment having two groups of solenoid valves, a first group of solenoid valves may be opened while a second group of solenoid valves is closed. Accordingly, the bank of capacitors may be discharged by the first group, or first phase, to open the corresponding solenoid valves, and then subsequently charged before being discharged by the second group, or second phase, to open those corresponding solenoid valves. In alternative embodiments, the drive circuits and methods of operating a solenoid valve may be implemented for the purpose of driving a single group of solenoid valves or a single solenoid valve.

In at least some embodiments, the bank of capacitors are charged through one or more drive circuits for the solenoid valves of one or more groups of valves. More specifically, the current supplied to the bank of capacitors may be that conducted through one or more solenoid coils. Moreover, in at least some embodiments, the group of solenoid valves that supply the current may be selected by a corresponding configuration, or commutation, of one or more semiconductor switches.

Current supplied to the solenoid coil of a solenoid valve in a spray system can be regulated to both provide a PWM fluid pattern based on periodic opening and closing of the solenoid valve, and operate as a switching boost converter to energize a high voltage bus. The high voltage bus may be used to energize the solenoid coil during opening to improve the speed, precision, and predictability of valve opening.

One exemplary agricultural spray system may operate valves at about 10 Hertz, i.e., a given solenoid valve is opened every 100 milliseconds (ms) according to a valve-pulsing PWM signal. The solenoid valve may take about 6 ms to open and about 4 ms to close. For the remainder of the 100 ms period, the solenoid valve maintains the poppet in the opened or closed position, otherwise referred to as idle time. Typically, when a solenoid valve is activated, i.e., opened and held open, the solenoid coil is energized continuously and, conversely, when the solenoid valve is deactivated, i.e., closed and held close, the solenoid coil is de-energized. It is realized herein the frequency and duty cycle of the current conducted through the solenoid coil may be regulated to continuously conduct current through the solenoid coil while maintaining the control of the desired valve-pulsing PWM signal.

The frequency and duty cycle may be regulated for four distinct durations: (1) holding the poppet in a closed position, (2) translating the poppet from the closed position to the opened position, (3) holding the poppet in the opened position, and (4) translating the poppet from the opened position to the closed position.

When holding the poppet in the closed position, a low voltage is applied to the solenoid coil and the coil is energized using a PWM signal such that the current conducted through the solenoid coil is regulated to below the opening threshold, i.e., the threshold current for opening the solenoid valve. The force required to translate the poppet to the opened position can vary with fluid pressure, fluid viscosity, or valve orifice size. Accordingly, the opening threshold can be computed at the beginning of an operating session or, for example, computed in real time during operation. Rather than keeping the solenoid coil de-energized, as is typical, maintaining some current through the solenoid coil enables energy to be continuously stored in the solenoid coil. During the PWM period and during any of the above durations, when the solenoid coil is de-energized, energy stored in the solenoid coil is recovered by a flyback circuit that charges a high voltage bus, i.e., the solenoid coil and flyback circuit form a switched boost converter. Moreover, the free-wheeling current enables the solenoid coil to obtain sufficient turn-on current more quickly than if the solenoid coil was conducting zero current.

The PWM signal is regulated in frequency and duty cycle to both maintain current conducted through the solenoid coil below the opening threshold and to optimize performance of the flyback circuit for charging the high voltage bus. When the low voltage is applied to the solenoid coil, e.g., when holding the poppet in the closed position and charging the high voltage bus, the rate at which the high voltage bus is charged generally follows the inductive current curve for the solenoid coil with respect to the fixed voltage and fixed inductance, i.e., the low voltage and the inductance defined by the solenoid coil. The inductive current curve is generally non-linear near the asymptotic current limit, and becomes more linear as current moves toward zero. However, the rate at which the solenoid coil discharges through the flyback circuit and onto the high voltage bus increases as the charge on the high voltage bus increases. Accordingly, it is realized herein, frequency and duty cycle of the PWM signal may be adjusted continuously to maintain a target coil current as the high voltage bus charges. Generally, for a given frequency, as the duty cycle of the PWM signal increases, more of the cycle time is spent storing energy in the solenoid coil and less of the cycle time is spent discharging the solenoid coil through the flyback circuit to charge the high voltage bus. Conversely, decreasing the duty cycle allots more time for discharge and less time for charging. Further, increasing the frequency of the PWM signal shortens the period of the PWM cycle and, consequently, reduces the time available for both charging and discharging the solenoid coil. Generally, a higher frequency PWM signal yields lower peak-to-peak current levels through the solenoid coil, and a lower frequency PWM signal lengthens cycle times and allots more time for charging and discharging the solenoid coil. The lower frequency PWM signal also reduces switching losses incurred by the FETs. However, at lower frequencies, current ripple can be introduced, which can limit the precision with which the driver circuit operates.

Referring again to holding the poppet in the closed position, the PWM signal is regulated, for example, to a low frequency and a low duty cycle to hold the coil current just below the opening threshold, while maximizing discharge (of the solenoid coil) time to charge the high voltage bus through the flyback circuit. The duty cycle of the PWM signal may be, for example, in the range of 10% to 50%. The valve is operated, i.e., opened and closed, in a frequency range of about 3-40 Hertz. The low frequency PWM signal may have a frequency in a range of, for example, 100 Hertz to 5 kilohertz. The frequency and duty cycle for a given solenoid valve may vary from these ranges according to the size, i.e., inductance of the solenoid coil, as well as the various parameters that define the opening threshold. In certain embodiments, frequency of the PWM signal may be increased just before opening, e.g., about 5 ms before opening, to ramp up coil current leading up to opening the solenoid valve. In such embodiments, the frequency of the PWM signal may be increased to above 1000 Hertz. In certain embodiments, the frequency may be increased to a range of 4 kilohertz to 100 kilohertz depending on the size of the solenoid valve.

When the solenoid valve is to be opened, i.e., the poppet translates from the closed position to the opened position, a high voltage (either positive or negative), sourced from the high voltage bus, is applied to the solenoid coil and the coil is energized using 100% duty cycle DC signal to increase the coil current above the opening threshold as quickly as possible. In certain embodiments, the coil current is increased significantly over the opening threshold to increase the pressure against which the solenoid valve can open (i.e., MOPD). The high voltage and high duty cycle PWM signal combine to provide a fast opening time. Moreover, the coil current leading up to the opening is preferably maintained just below the opening threshold, thereby minimizing the time required to increase the current through the solenoid coil to above the opening threshold. Accordingly, the delay in opening the solenoid valve is reduced.

When the solenoid valve is opened, there is a duration when the poppet is maintained in the opened position. Generally, the power necessary to hold the poppet in an opened position is much less than the power necessary to translate the poppet to the opened position. It is realized herein that once the poppet is in the opened position, the high voltage may be removed from the solenoid coil, i.e., replaced by the low voltage, and duty cycle may be reduced, i.e., a PWM signal, to reduce the power consumption of the solenoid valve. The coil current is regulated to just above a closing threshold, i.e., a current threshold below which the force generated by the solenoid coil is insufficient to hold the poppet in the opened position. When the solenoid coil is de-energized during the PWM period, energy stored in the solenoid coil is recovered by the flyback circuit that charges the high voltage bus.

When holding the poppet in the opened position, coil current is regulated to above the closing threshold. Accordingly, the frequency and duty cycle of the PWM signal are regulated to hold the coil current just above the closing threshold and to optimize performance of the flyback circuit in charging the high voltage bus. The force required to hold the poppet in the opened position can vary with fluid pressure, fluid viscosity, or valve orifice size. Accordingly, the closing threshold can be computed at the beginning of an operating session or, for example, computed in real time during operation. Moreover, the frequency and duty cycle are regulated to reduce power consumption when the poppet is not being translated. Duty cycle is regulated to maintain coil current just above the closing threshold and to allot as much time as possible to discharge the solenoid coil through the flyback circuit to charge the high voltage bus. In certain embodiments, for example, duty cycle is regulated to a range of 40% to 90%. As described above, this range of duty-cycle may vary for a given solenoid valve. Frequency of the PWM signal is generally held high, for example, in a range of 1000 to 2000 Hertz, to provide lower peak-to-peak coil current levels and, consequently, tighter control to hold coil current just above the closing threshold. In other embodiments, the frequency of the PWM signal may be higher or lower depending on the application. In certain embodiments, the frequency may droop to lengthen the cycle and the duty cycle reduced to allot additional discharge time for the solenoid coil.

When the solenoid valve is to be closed, voltage is removed from the solenoid coil to reduce the coil current to below the closing threshold. Once the poppet is in the closed position, it is realized herein, the solenoid coil should continue to conduct a current to maintain the energy stored in the solenoid coil and to remain ready for the next opening cycle. Accordingly, the current conducted through the solenoid coil is regulated to just below the opening threshold. In contrast, the solenoid coil is typically de-energized entirely.

In alternative embodiments, the advantages described above for the use of a high voltage when opening the solenoid valve can be achieved using solenoid coils having similar magnetic characteristics and a lower internal resistance. Such a configuration enables faster turn-on times without providing a separate high voltage bus. The opening operation of the solenoid valve is generally unchanged, however, once opened, the voltage applied across the solenoid coil can be reduced, i.e., divided, by coupling multiple solenoid coils for multiple solenoid valves in series, i.e., daisy-chaining solenoid coils, or by incorporating additional drive circuits and ballast resistors, or with the addition of one or more flyback circuits.

In further alternative embodiments, the solenoid valve and solenoid coil may be designed to fit the drive circuit and the achievable voltage levels. Such optimization ensures power ratings of the solenoid coil are acceptable for the power levels applied to the solenoid valve.

Referring now to the Figures, FIG. 1 is a perspective view of one embodiment of a spray system, indicated generally at 10, operatively connected to a work vehicle 12. As shown, work vehicle 12 includes a cab 14 and a plurality of wheels 16. Work vehicle 12 may in certain embodiments be an agricultural tractor having any suitable configuration. However, it should be appreciated that in other embodiments, any other suitable aero or ground means may be provided for moving spray system 10. For example, in other embodiments, work vehicle 12 may not include a cab, and instead may have any suitable operator station. Further, in some embodiments, work vehicle 12 and/or spray system 10 may include a global positioning system (e.g., a GPS receiver) for automated control of work vehicle 12 and/or spray system 10. In some embodiments, the global positioning system is used to monitor a travel speed of vehicle 12 and/or spray system 10, and/or to monitor a position of work vehicle 12 and/or spray system 10.

In the example embodiment, spray system 10 includes at least one boom wheel 18 for engaging a section of ground with a crop, produce, product or the like (generally, P), a tank or reservoir 22, and a spray boom 24. Spray boom 24 includes a plurality of nozzle assemblies 34 attached thereto and in fluid communication with tank 22. Tank 22 holds a product S, such as a liquid, a mixture of liquid and powder, or other product. Product S may be a quantity of water or an agrochemical such as a fertilizer or a pesticide, and may be sprayed from nozzle assemblies 34 onto, for example, a crop or produce or ground P itself, as shown in FIG. 1 and described in greater detail below. It should be appreciated, however, that in other embodiments, system 10 may have any other suitable configuration. For example, in other embodiments, system 10 may not include boom wheel 18 or may alternatively include any suitable number of boom wheels 18. Further, while work vehicle 12 is depicted as towing spray system 10 in the example embodiment, it should be appreciated that, in other embodiments, work vehicle 12 may transport spray system 10 in any suitable manner that enables spray system 10 to function as described herein.

The quantity of product S held in tank 22 generally flows through a conduit to nozzle assemblies 34. More specifically, in the embodiment illustrated in FIG. 1, product S flows from tank 22, through a pipe 30 to a boom pipe 32, and from boom pipe 32 to nozzle assemblies 34. In certain embodiments, nozzle assemblies 34 comprise direct acting solenoid valve equipped nozzles (see, e.g., FIG. 2) and system 10 may include a pump, transducers to measure fluid pressure and fluid flow, sectional regulating valves, and a pressure and/or flow controller (not shown in FIG. 1). If included, the pump may be positioned downstream from tank 22, upstream from boom pipe 32 and nozzle assemblies 34, and in operative communication with a controller for controlling operation thereof. The pump may be a pulse width modulation controlled pump configured to provide a desired amount of product S flow through system 10. The spray system 10 may also include a pressure or flow controller configured to vary certain operating parameters of the pump, such as the pump's pulse frequency and/or duty cycle, to obtain a desired product flow rate through system 10.

Referring still to FIG. 1, product S flows through nozzle assemblies 34 and may be applied to ground P in various ways. For example, product S may flow from nozzle assemblies 34 in a pulsed pattern. It should be appreciated that terms "pipe" and "conduit," as used herein, may mean any type of conduit or tube made of any suitable material such as metal or plastic, and moreover that any other suitable ground application devices can be added to provide varying effects of placement of product S on top or below a soil surface of ground P, such as via pipes, knives, coulters, and the like.

Figure 2:
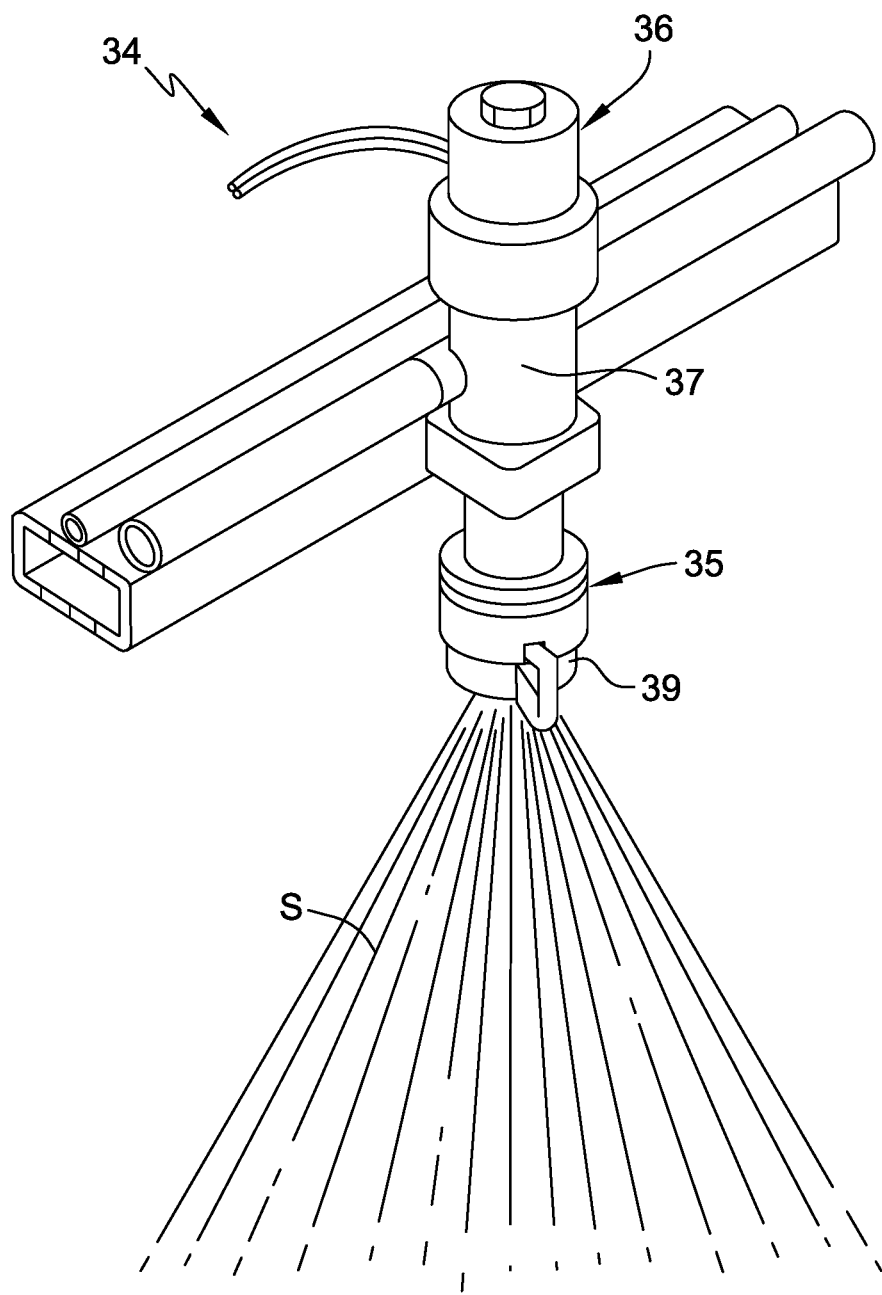
FIG. 2 is a perspective view of one embodiment of a nozzle assembly suitable for use with the agricultural spray system of FIG. 1.

FIG. 2 is a perspective view of one embodiment of a nozzle assembly 34 suitable for use with spray system 10 of FIG. 1. As shown in FIG. 2, nozzle assembly 34 generally includes a valve assembly 36, a nozzle body 37 configured to receive product S flowing through boom pipe 32 and a spray nozzle 39 mounted to and/or formed integrally with nozzle body 37 for expelling product S from nozzle assembly 34 onto crops, product and/or ground P.

Figure 3:
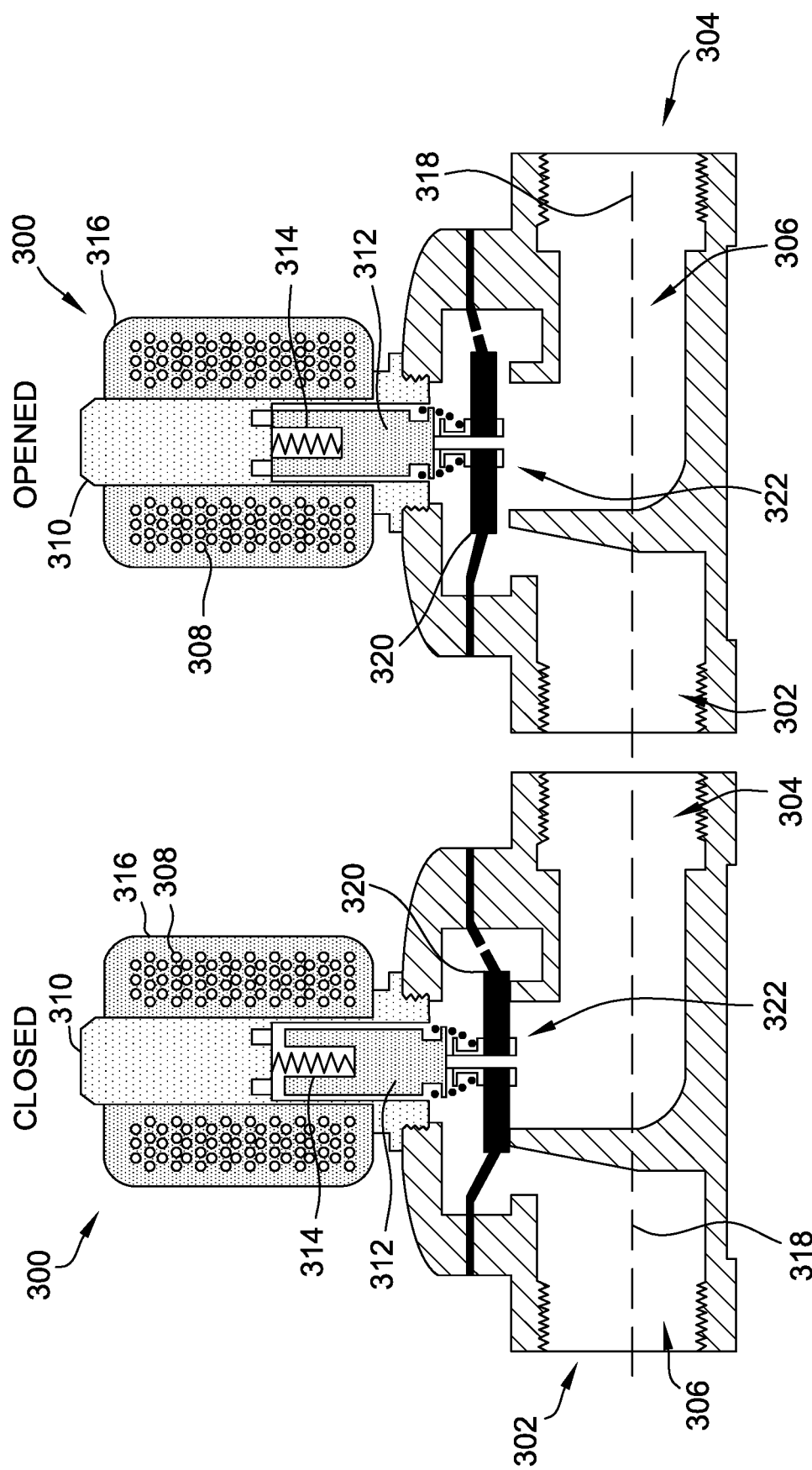
FIG. 3A and FIG. 3B are sectional views of a portion of a solenoid valve suitable for use in the nozzle assembly shown in FIG. 2.

In some embodiments, valve assembly 36 is a solenoid valve (see, e.g., FIG. 3). Moreover, in some embodiments, valve assembly 36 may be configured to be mounted to and/or integrated with a portion of spray nozzle 39. In some embodiments, for example, valve assembly 36 may be mounted to the exterior of nozzle body 37, such as by being secured to nozzle body 37 through the nozzle's check valve port. Alternatively, valve assembly 36 may be integrated within a portion of nozzle body 37.

FIGS. 3A and 3B are schematic cross-sectional views of one embodiment of an electric solenoid valve 300 suitable for use in nozzle assembly 34 shown in FIG. 2. FIG. 3A illustrates solenoid valve 300 in a closed position. FIG. 3B illustrates solenoid valve 300 in an open position. In general, valve 300 includes an inlet 302 and an outlet 304 for receiving and expelling fluid 306 from valve 300. Valve 300 also includes a solenoid coil 308 located on and/or around a guide 310. For instance, in one embodiment, solenoid coil 308 is wrapped around guide 310. Additionally, an actuator or poppet 312 is movably disposed within guide 310. In particular, poppet 312 may be configured to be linearly displaced within guide 310. Moreover, as shown, valve 300 includes a spring 314 coupled between guide 310 and poppet 312 for applying a force against poppet 312 to bias poppet 312 towards the closed position. Valve 300 may also include a valve body 316 or other outer covering disposed around coil 308.

As shown in the illustrated embodiment, valve 300 is configured as an in-line valve. Thus, fluid 306 may enter and exit valve 300 through inlet 302 and outlet 304, respectively, along a common axis 318. In other words, the inlet 302 and outlet 304 may generally be aligned along axis 318. In alternative embodiments, valve 300 may be in any other suitable configuration for a solenoid valve, such as, for example, a counter flow valve or a pressure-balanced valve.

Figure 4:
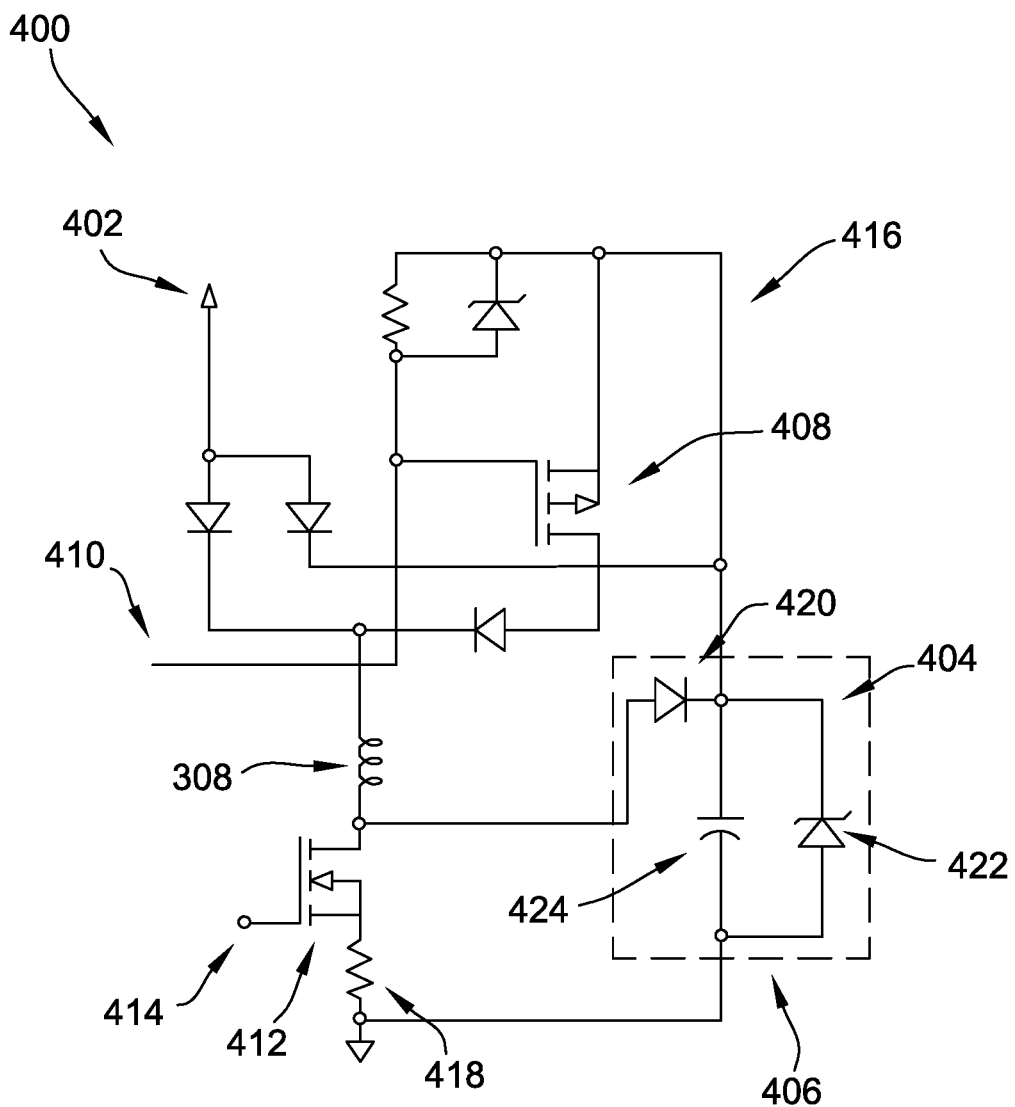
FIG. 4 is a schematic diagram of a drive circuit for use with the solenoid valve shown in FIG. 3.

In addition, solenoid coil 308 may be coupled to a controller (shown in FIG. 5) configured to regulate or control the current provided to coil 308. Coil 308 may be configured to receive a controlled electric current or electric signal from the controller such that poppet 312 may move within guide 310. For example, in one embodiment, the controller includes a drive circuit as shown in FIG. 4, or any other suitable device that is configured to apply a regulated current to coil 308, thereby creating a magnetic field that biases (by attraction or repulsion) poppet 312 towards the opened or closed position.

In several embodiments, a modulated square wave (e.g., PWM signal) drives valve 300 to control the opening and closing. The frequency and duty cycle of the PWM signal are used to regulate current conducted through the solenoid coil. For example, there are durations when the PWM signal is 100% duty cycle to open valve 300, and other durations when the PWM signal is 0% duty cycle to close valve 300. During the times between opening and closing, when the poppet is being held in the opened or closed position, the frequency and duty cycle of the PWM signal can be modulated to regulate the current conducted through the solenoid coil to below or above various thresholds based on, for example, when a high voltage bus should be charged, or when valve 300 is anticipated to transition to its next state (e.g., from open to close, or from close to open).

Forces from spring 314, fluid 306 and coil 308 act on poppet 312 simultaneously. Specifically, the forces from spring 314 and fluid 306, tend to bias poppet 312 towards the closed position, while the force from coil 308 tends to bias poppet 312 towards the opened position.

Thus, when valve 300 is unpowered (i.e., when a voltage is not applied across coil 308), spring 314 may force poppet 312 towards the closed position such that the system pressure has a tendency to force valve 300 into a sealed or closed position. In such an embodiment, poppet 312 may include a rubber disk or any other suitable sealing member 320 configured to press against an orifice 322 of outlet 304 to create a leak-free seal on valve 300 when valve 300 is in the closed position. Additionally, when valve 300 is powered (i.e., when a voltage is applied to coil 308), poppet 312 may be attracted by coil 308 away from orifice 322 such that poppet 312 is moved to the open position. Specifically, the current supplied to coil 308 may be controlled such that the force acting on poppet 312 by coil 308 is sufficient to translate poppet 312, thereby opening valve 300.

When valve 300 is being pulsed, the movement of poppet 312 may be cycled between the open position and a closed position, wherein poppet 312 is sealed against orifice 322. In such an embodiment, in order to transition valve 300 from the closed position to the open position, valve 300 is initially energized with a 100% duty cycle to move poppet 312 from the closed position to the open position as quickly as possible. Subsequently, the current supplied to coil 308 may be controlled such that poppet 312 may be cyclically pulsed between the closed position and the open position.

The sizes of inlet 302 and outlet 304, as well as the geometry and/or configuration of poppet 312, orifice 322, and guide 310, may be chosen such that the force acting on poppet 312 from coil 308 may overcome the fluid forces and spring forces acting on poppet 312. Similarly, in one embodiment, spring 314 may be sized such that the spring force corresponds to the minimal amount of force required to maintain a drip-free valve 300 when valve 300 is unpowered.

Generally, the solenoid valve 300 may be utilized to control the flow through any suitable device. However, in several embodiments of the present disclosure, the solenoid valve 300 may be used to control the flow through an agricultural spray nozzle. In such embodiments, the disclosed solenoid valve 300 may be configured as part of a nozzle assembly for use with various agricultural spraying systems.

Although systems and methods are described herein with reference to an agricultural spray system, embodiments of the present disclosure are suitable for use with agricultural fluid application systems other than spray systems. In some embodiments, for example, the systems and methods of the present disclosure are implemented in a fluid application system that injects fluid, such as fertilizer, into the soil through dispensing tubes, rather than spray nozzles.

FIG. 4 is a schematic diagram of a one embodiment of a drive circuit 400 for use with the solenoid valve shown in FIG. 3. Drive circuit 400 includes a low voltage bus 402 and a high voltage bus 404. Low voltage bus 402 is configured to be energized by a power source, such as, for example, a 12 Volt DC power supply. High voltage bus 404 is configured to be energized by a flyback circuit 406 coupled to solenoid coil 308. In one embodiment, low voltage bus 402 is charged to 12 Volt DC and high voltage bus 404 is charged to 24 Volt DC. In alternative embodiments, voltages of low voltage bus 402 and high voltage bus 404 may vary over time. For example, low voltage bus 402 is ideally charged to 12 Volt DC, but varies over time from 11-14 Volt DC. Likewise, the voltage to which high voltage bus 404 is charged may vary over time and may exceed 24 Volt DC. For example, in one embodiment, high voltage bus 404 is charged up to 36 Volts DC.

Drive circuit 400 includes a switch 408 for selectively coupling high voltage bus 404 to solenoid coil 308. For example, switch 408 is illustrated as a PFET device controlled by a switching signal 410 to couple and decouple high voltage bus 404 to solenoid coil 308. Drive circuit 400 is configured to be coupled to a controller (shown in FIG. 5) that generates switching signal 410 according to a valve-pulsing PWM signal that initiates opening of the solenoid valve, such as solenoid valve 300 shown in FIG. 3.

Drive circuit 400 includes a switch 412 that periodically couples solenoid coil 308 to ground, thereby enabling solenoid coil 308 to conduct current. For example, switch 412 is illustrated as a NFET device controlled by a switching signal 414 generated by a controller (not shown). Switch 412 applies a PWM signal to solenoid coil 308 to energize solenoid coil 308 while holding poppet 312 in position, e.g., in the opened or closed positions. Switch 412 is operated at a frequency and duty cycle, thereby regulating the frequency and duty cycle of the PWM signal that energizes solenoid coil 308. Switch 412 is opened and closed when closing and opening valve 300, respectively. Switch 412 is closed to apply a 100% duty cycle DC voltage to solenoid coil 308 when opening valve 300. Likewise, switch 412 is opened to remove power from solenoid coil 308 when closing valve 300.

Switches 408 and 412 at least partially compose a control circuit 416. In certain embodiments, control circuit 416 includes a current sensor, such as current sense resistor 418 configured to measure the current conducted through solenoid coil 308. Control circuit 416 may then regulate the frequency and duty cycle of the current conducted through solenoid coil 308 by controlling switch 412 based on the coil current measured by current sense resistor 418. In alternative embodiments, control circuit 416 includes any other suitable device for measuring current through solenoid coil 308, such as, for example, a hall-effect sensor. In further alternative embodiments, control circuit 416 is configured to measure current through solenoid coil 308 when solenoid coil 308 is charging, and further configured to predict discharge time of solenoid coil 308 based on the potential on high voltage bus 404.

Flyback circuit 406 includes a feed diode 420, an over-voltage protection diode 422, and a capacitor 424. When switch 412 periodically de-energizes solenoid coil 308 according to the PWM signal, energy stored in solenoid coil 308 builds an opposite-polarity voltage across solenoid coil 308 that is steered by feed diode 420 to build a charge across capacitor 424. The resulting voltage across capacitor 424 represents high voltage bus 404.

Figure 5:
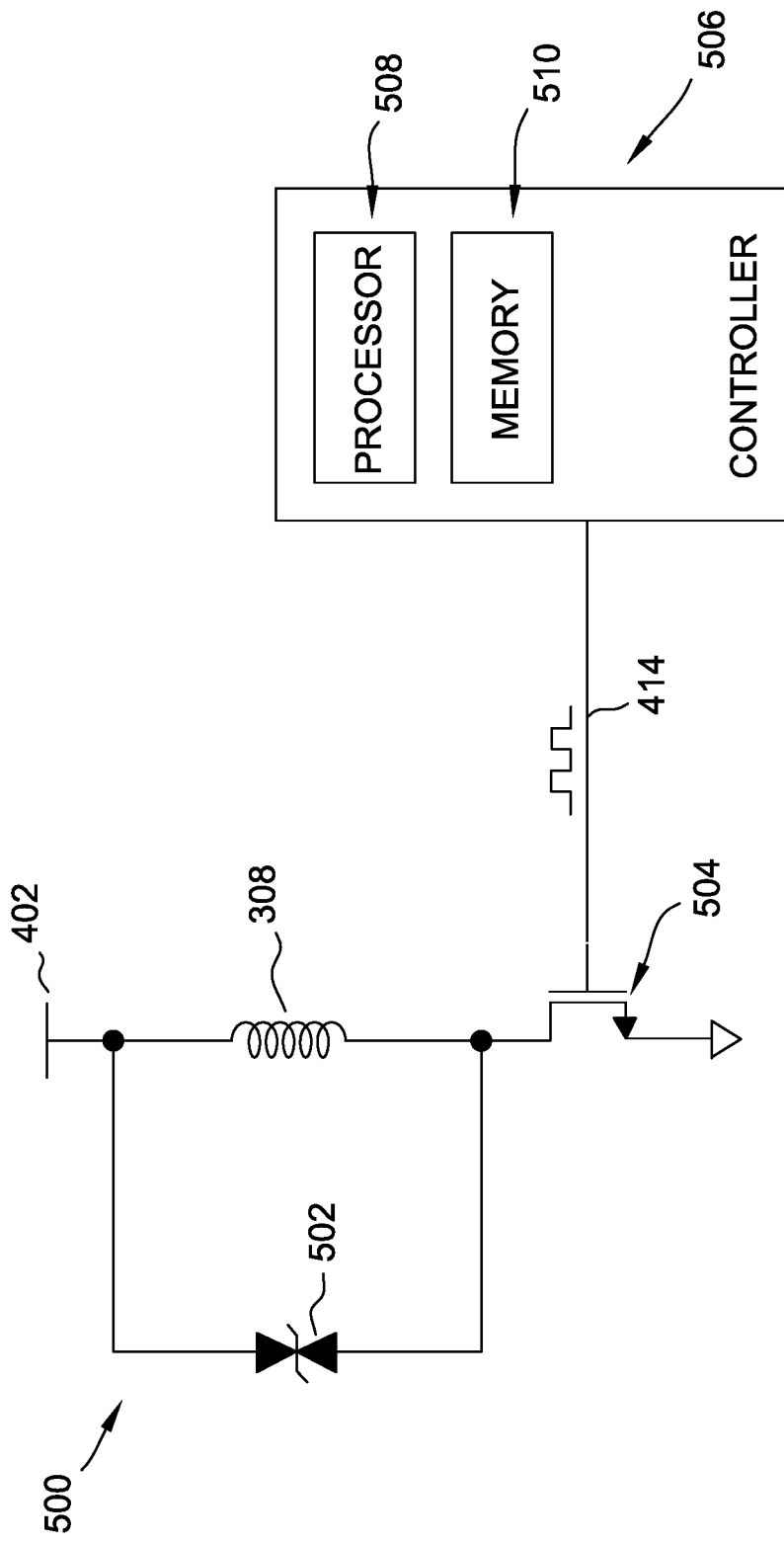
FIG. 5 is a schematic diagram of an embodiment of a drive circuit for use with the solenoid valve shown in FIG. 3.

FIG. 5 is a schematic diagram of another embodiment of a drive circuit 500 for use with the solenoid valve shown in FIG. 3 (represented by solenoid coil 308). Drive circuit 500 includes a bipolar transient voltage suppression (TVS) diode 502 coupled in parallel with solenoid coil 308. More specifically, bipolar TVS diode 502 is coupled in parallel with only solenoid coil 308 to reduce the loading of low voltage bus 402 or the ground during flyback. When a FET 504 controlling solenoid coil 308 is opened, the flyback current is sourced only from solenoid coil 308 and conducts only through bipolar TVS diode 502. Consequently, FET 504 must withstand (e.g., from drain to source) the sum of the highest bus voltage, such as that of low voltage bus 402, and the breakdown voltage of bipolar TVS diode 502. In one embodiment for example, where the bus voltage is 12 VDC, the reverse breakdown voltage of bipolar TVS diode 502 may be about 30 VDC. Accordingly, FET 504 should be rated (from drain to source) for at least 42 VDC.

Drive circuit 500 is coupled to a controller 506. Controller 506 may be enclosed within valve assembly 300, may be enclosed within nozzle assembly 34, as shown in FIG. 2, or may exist some distance away from nozzle assembly 34. Controller 506 may generally comprise a processor 508 or any suitable computer and/or other processing unit, including any suitable combination of computers, processing units and/or the like that may be communicatively coupled to one another (e.g., a controller may form all or part of a controller network). Thus, controller 506 may include one or more processor(s) 508 and associated memory device(s) 510 configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 510 of controller 506 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 508, configure controller 506 to perform various functions including, but not limited to, controlling the current supplied to solenoid coil 308, monitoring inlet and/or outlet pressures of the disclosed valve(s), monitoring poppet operation of the disclosed valves, receiving operator inputs, performing the calculations, algorithms and/or methods described herein and various other suitable computer-implemented functions.

Referring to the drive circuits of FIGS. 4 and 5, the frequency and duty cycle of the PWM signal generated by switch 412 or FET 504 is regulated for four distinct durations: (1) holding poppet 312 in a closed position, (2) translating poppet 312 from the closed position to the opened position, (3) holding poppet 312 in the opened position, and (4) translating poppet 312 from the opened position to the closed position.

When holding poppet 312 in the closed position, a low voltage, supplied by low voltage bus 402, is applied to solenoid coil 308 and solenoid coil 308 is energized by a PWM signal, via switch 412 for example, such that the current conducted through solenoid coil 308 is regulated to below the opening threshold, i.e., the threshold current for opening solenoid valve 300. Maintaining some current through solenoid coil 308 enables energy to be continuously stored in solenoid coil 308, i.e., solenoid coil 308 is charged. During the PWM period, when solenoid coil 308 is de-energized, energy stored in solenoid coil 308 is discharged and recovered by flyback circuit 406 that charges high voltage bus 404, i.e., solenoid coil 308 and flyback circuit 406 form a switched boost converter. Switch 412 is configured to regulate duty cycle and frequency of the PWM signal to hold the coil current below the opening threshold and to charge high voltage bus 404.

When solenoid valve 300 is to be opened, i.e., poppet 312 translates from the closed position to the opened position, a high voltage (either positive or negative), sourced from high voltage bus 404, is applied, via switch 408, to solenoid coil 308 and solenoid coil 308 is energized using a 100% duty cycle DC signal to drive the coil current above the opening threshold as quickly as possible. In certain embodiments, the coil current is increased over the maximum conventional current that would be provided with a 12 VDC supply, i.e., to "overshoot," to increase the fluid pressure against which solenoid valve 300 can open. Moreover, the coil current leading up to the opening is preferably maintained just below the opening threshold, thereby minimizing the time required to increase the coil current above the opening threshold. Accordingly, the delay in opening solenoid valve 300 is reduced.

In an alternative embodiment, when solenoid valve 300 is to be opened, the low voltage, sourced from low voltage bus 402, is initially applied to solenoid coil 308 for a duration of, for example, 8 ms, after which the high voltage, sourced by high voltage bus 404, is applied to solenoid coil 308. The additional voltage applied to solenoid coil 308 pushes the coil current above the opening threshold and reduces the turn-on time, while also enabling solenoid valve 300 to open against greater fluid pressures.

When solenoid valve 300 is opened, there is a duration when poppet 312 is maintained in the opened position. Generally, the power necessary to hold poppet 312 in an opened position is much less than the power necessary to translate poppet 312 to the opened position. It is realized herein that once poppet 312 is in the opened position, the high voltage may be replaced by the low voltage that is applied by a PWM signal, via switch 412, to reduce the power consumption of solenoid valve 300. The coil current is regulated to just above a closing threshold, i.e., a current threshold below which the force generated by solenoid coil 308 is insufficient to hold poppet 312 in the opened position. When solenoid coil 308 is de-energized during the PWM period, energy stored in solenoid coil 308 is recovered by flyback circuit 406 that charges high voltage bus 404. In alternative embodiments, when poppet 312 is in the opened position, coil current is regulated to efficiently charge, e.g., a high voltage bus, a flyback converter, or one or more capacitors, until a time nears when poppet 312 should transition to the closed position, at which point coil current is regulated to just above the closing threshold.

When solenoid valve 300 is to be closed, FET 504 opens and solenoid coil 308 is de-energized to reduce the coil current to below the closing threshold as quickly as possible. Coil current is directed through bipolar TVS diode 502 and dissipated as heat. In certain embodiments, solenoid coil 308 continues to conduct a current to maintain the energy stored in solenoid coil 308 and to remain ready for the next opening cycle. Accordingly, in such embodiments, the current conducted through solenoid coil 308 is regulated to just below the opening threshold. In other embodiments, coil current is reduced to zero before re-energizing the coil to open solenoid valve 300 again.

Figure 6:
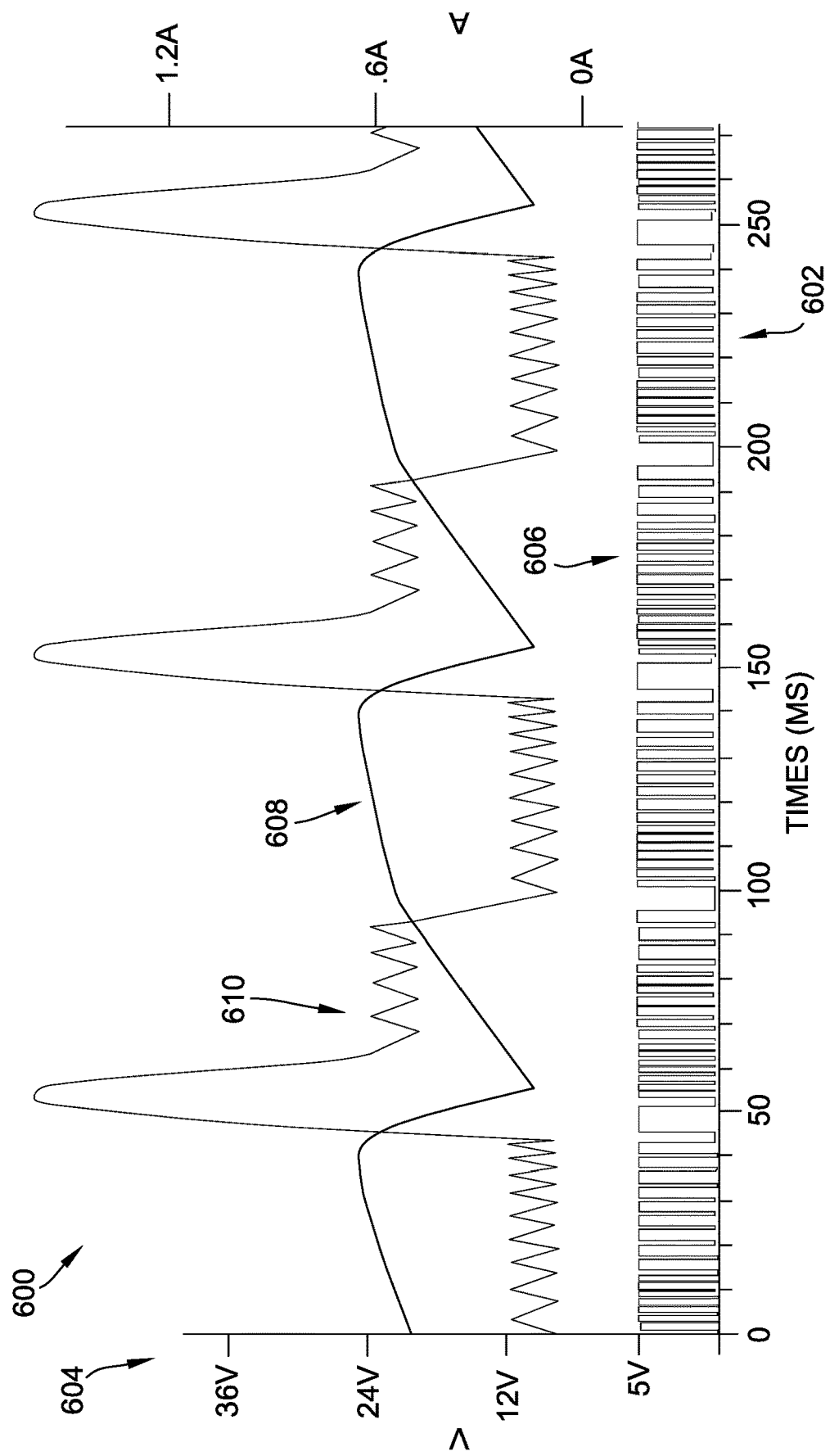
FIG. 6 is a plot of exemplary signals present in the drive circuit shown in FIG. 4.

FIG. 6 is a plot 600 of exemplary signals present in drive circuit 400, shown in FIG. 4. Plot 600 illustrates signals over a horizontal time axis 602 expressed in ms and ranging from zero to about 250 ms. Plot 600 illustrates signals on a vertical axis 604 that represents voltage expressed in Volts DC and ranging from zero to about 36 Volt DC, or expressed in Amperes ranging from zero to above 1.2 Amperes. Plot 600 includes a PWM signal 606 for controlling switch 412, such as, for example, switching signal 414 (shown in FIG. 4). Notably, PWM signal 606 has a varying frequency and duty cycle. Plot 600 includes a bus voltage signal 608 representing the high voltage present on high voltage bus 404 (shown in FIG. 4). Notably, bus voltage signal 608 increases over time as it is charged by flyback circuit 406 and is discharged rapidly when solenoid valve 300 is opened. Plot 600 includes a coil current signal 610 representing the buildup of current conducted through solenoid coil 308 over time. Notably, coil current signal 610 is generally non-zero and is highest when opening solenoid valve 300. In certain embodiments, for example, coil current signal 610 exhibits a "boot heel" profile extending beyond 1.2 ampere when opening solenoid valve 300. The brief increase (e.g. 2.6 ampere) in coil current amplitude over the nominal opening current threshold (e.g., about 0.6 ampere) is a result of the momentarily increased coil voltage, and enables solenoid valve 300 to open more quickly, to open against an increase fluid pressure (i.e., increased MPOD), or both. Once solenoid valve 300 is opened, the coil voltage and current are reduced using a low duty cycle PWM signal to conserve power, ultimately consuming less power on average than had current simply ramped up to the opening threshold for the coil and operated at full voltage for duration of holding the valve open.

Figure 7:
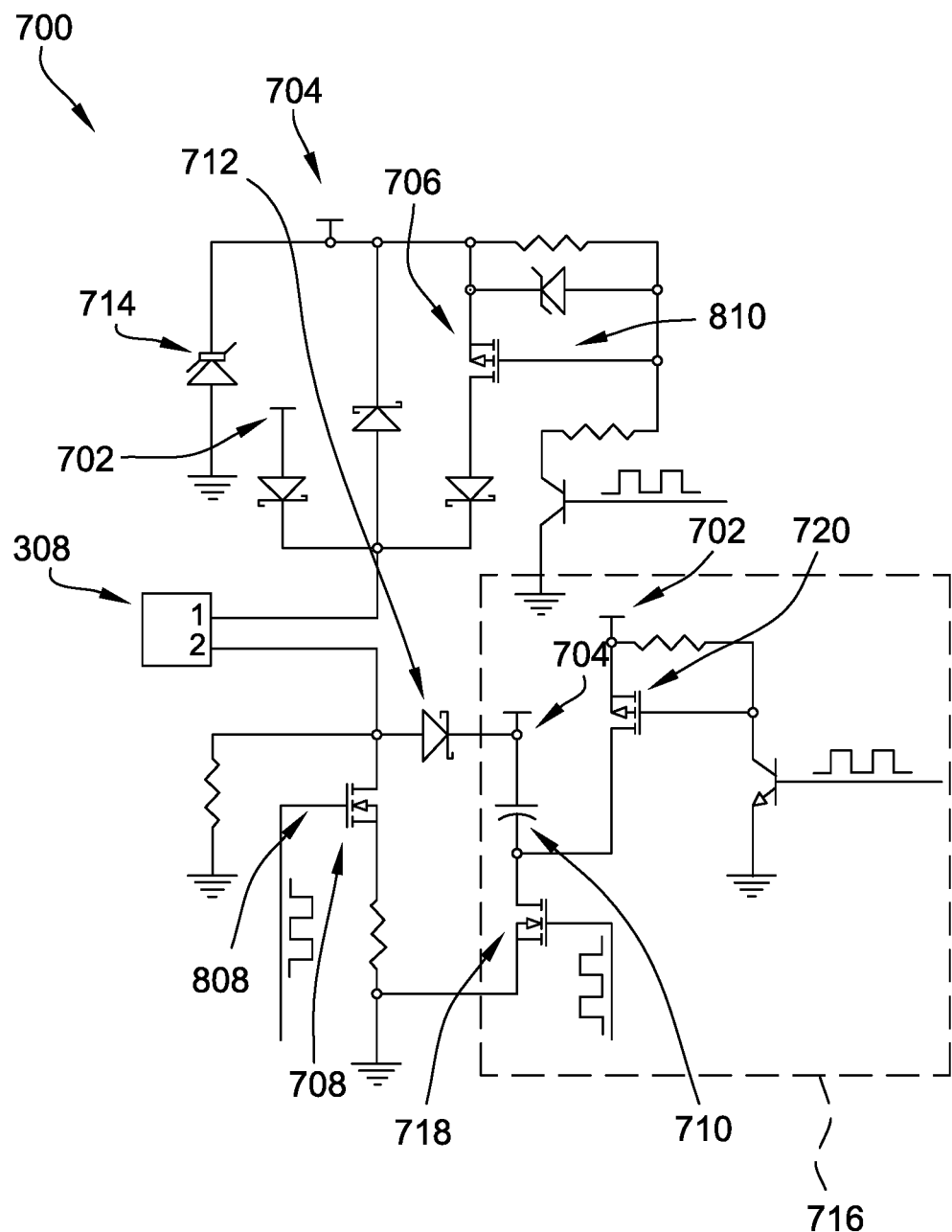
FIG. 7 is a schematic diagram of an exemplary drive circuit for use with the solenoid valve shown in FIG. 3.
Figure 8:
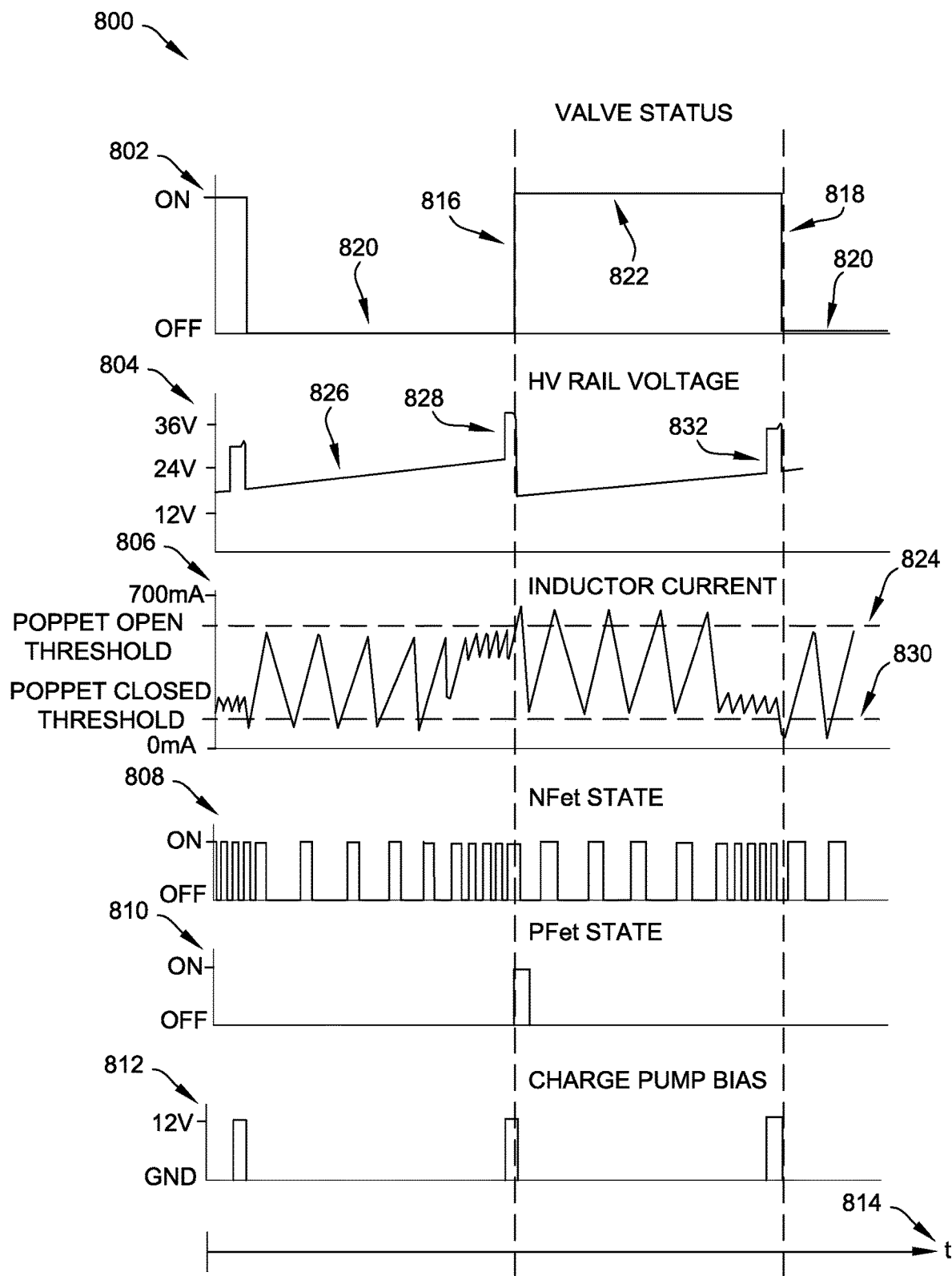
FIG. 8 is a plot of exemplary signals present in the drive circuit shown in FIG. 7.

FIG. 7 is a schematic diagram of another example drive circuit 700 for use with solenoid valve 300 and solenoid coil 308 shown in FIG. 3. FIG. 8 is a plot 800 of exemplary signals over time, t, present in drive circuit 700 shown in FIG. 7. FIG. 8 includes plots of signals 802, 804, 806, 808, 810, and 812 with respect to time, t, represented by a horizontal time axis 814.

Drive circuit 700 includes a low voltage bus 702 and a high voltage bus 704. A potential 804 of high voltage bus 704 is illustrated in FIG. 8. Potential 804 is illustrated with respect to a vertical axis for voltage ranging from zero Volts DC to 36 Volts DC.

Power supplied to solenoid coil 308 is regulated by a switch 706 and a switch 708. Switch 706 is illustrated as a PFET device that selectively couples high voltage bus 704 to solenoid coil 308. Switch 706 is controlled by a PFET control signal 810, illustrated in FIG. 8. PFET control signal 810 is illustrated as a discrete signal, i.e., having an on state and an off state. Switch 708 is illustrated as an NFET device that selectively couples solenoid coil 308 to ground, thereby enabling solenoid coil 308 to conduct a coil current 806, illustrated in FIG. 8. Coil current 806 is illustrated with respect to a vertical axis for Amperage ranging from zero milliamp (mA) to 700 mA. Switch 708 is controlled by an NFET control signal 808, illustrated in FIG. 8. NFET control signal 808 is illustrated as a discrete signal, i.e., having an on state and an off state.

Drive circuit 700 includes a flyback circuit that includes a capacitor 710, a feed diode 712, and an over-voltage protection diode 714. When solenoid coil 308 is de-energized, an inverse potential develops across solenoid coil 308 and solenoid coil 308 discharges stored energy over time. Solenoid 308 discharges stored energy through feed diode 712 and charges capacitor 710. The potential generated across capacitor 710 contributes to potential 804 to which high voltage bus 704 is charged.

In certain embodiments, drive circuit 700 includes a charge pump circuit 716. Charge pump circuit 716 is configured to periodically and momentarily change the reference of capacitor 710 to boost potential 804 of high voltage bus 704 with respect to ground prior to opening or closing valve 300. Charge pump circuit 716 includes FET devices 718 and 720 configured to selectively reference capacitor 710 to ground, to low voltage bus 702, or, in certain embodiments, capacitor 710 is allowed to "float," i.e., as an open circuit. When referenced to low voltage bus 702, i.e., capacitor 710 is coupled in series with low voltage bus 702, the potential 804 of high voltage bus 704 with respect to ground becomes a sum of the low voltage bus 702 potential and the potential across capacitor 710. FET devices 718 and 720 are controlled to correspond with a charge pump bias signal 812, illustrated in FIG. 8. Charge pump bias signal 812 is illustrated as a discrete signal alternating between ground reference and low voltage bus 702, and represents the voltage to which a "low" side of capacitor 710 is referenced. In certain embodiments, where capacitor 710 is allowed to float, solenoid coil 308 is forced to discharge through over-voltage protection diode 714, which has a high reverse-bias voltage of, for example, 90-100 Volts. In such an embodiment, potential 804 on high voltage bus 704 is increased to the reverse-bias voltage for a brief duration, rather than a potential across capacitor 710.

During operation, drive circuit 700 operates valve 300 according to a valve control signal 802, illustrated in FIG. 8. Valve control signal 802 defines a PWM pattern of opening and closing valve 300. More specifically, valve 300 opens on a rising edge 816 and closes on a falling edge 818. Otherwise, valve 300 is maintained in either the closed 820 or opened position 822.

When valve 300 is in closed position 820, high voltage bus 704 is disconnected from solenoid coil 308, as illustrated by PFET control signal 810 leading up to rising edge 816 of valve control signal 802. Solenoid coil 308 is energized via low voltage bus 702 and a PWM signal represented by NFET control signal 808. The frequency and duty cycle of NFET control signal 808 are regulated to hold coil current 806 below an opening threshold 824 and to charge high voltage bus 704, as illustrated by the increase 826 in potential 804 leading up to rising edge 816. The frequency and duty cycle of NFET control signal 808 correspond to periods of charge and discharge of solenoid coil 308, as illustrated in coil current 806 and, more specifically, peak-to-peak variations in coil current 806 leading up to rising edge 816. Notably, the frequency of NFET control signal 808 increases leading up to rising edge 816. In certain embodiments, the frequency of NFET control signal 808 may decrease slowly and then increase sharply just before rising edge 816. Generally, both frequency and duty cycle can be varied to optimize the charge time and discharge time of solenoid coil 308.

Charge pump circuit 716 is activated momentarily prior to rising edge 816, as illustrated by charge pump control signal 812. More specifically, reference of capacitor 710 is switched from ground to low voltage bus 702 for a brief duration prior to rising edge 816 and corresponding to a momentary increase 828 in potential 804 on high voltage bus 704.

At rising edge 816, valve 300 is actuated, i.e., poppet 312 is translated from the closed position 820 to the opened position 822. The actuation corresponds to application of potential 804 on high voltage bus 704 to solenoid coil 308, as illustrated in PFET control signal 810. The increased potential 828 is applied with 100% duty cycle for a brief duration, illustrated by NFET control signal 808, to solenoid coil 308, enabling coil current 806 to exceed opening threshold 824 as quickly as possible.

When valve 300 is in the opened position 822, potential 804 on high voltage bus 704 is reduced (as a result of discharge during opening) and PFET control signal 810 controls switch 706 to disconnect high voltage bus 704 from solenoid coil 308. Charge pump circuit 716 re-references capacitor 710 to ground, as illustrated by the pulse in charge pump control signal 812. Solenoid coil 308 continues to be energized via low voltage bus 702 and NFET control signal 808 resumes PWM operation with a reduced frequency and a duty cycle configured to regenerate potential 804 on high voltage bus 704. Further, the frequency and duty cycle of NFET control signal 808 are regulated to maintain coil current 806 above closing threshold 830.

Leading up to falling edge 818, at which point valve 300 is closed, i.e., poppet 312 translates from opened position 822 to closed position 820, the frequency of NFET control signal 808 is increased to maintain coil current 806 just above closing threshold 830 such that, when falling edge 818 arrives and switch 708 is opened, coil current 806 falls below closing threshold 830 as quickly as possible. Again, charge pump circuit 716 switches the reference on capacitor 710 to high voltage bus 704 and corresponding to a momentary increase in potential 804 on high voltage bus 704. The momentary higher potential 832 on high voltage bus 704 further reduces the time necessary for solenoid coil 308 to discharge when de-energized.

In an alternative embodiment, rather than charge pump circuit 716 referencing capacitor 710 to high voltage bus 704 or ground, capacitor 710 is allowed to float, resulting in coil current being directed through a protection diode 714, enabling solenoid valve 300 to close more quickly.

Once valve 300 is back in closed position 820 and coil current is dissipated, NFET control signal 808 resumes PWM operation, capacitor 710 is re-referenced to ground, and solenoid coil 308 resumes cycles of charging and discharging to recharge high voltage bus 704.

Figure 9:
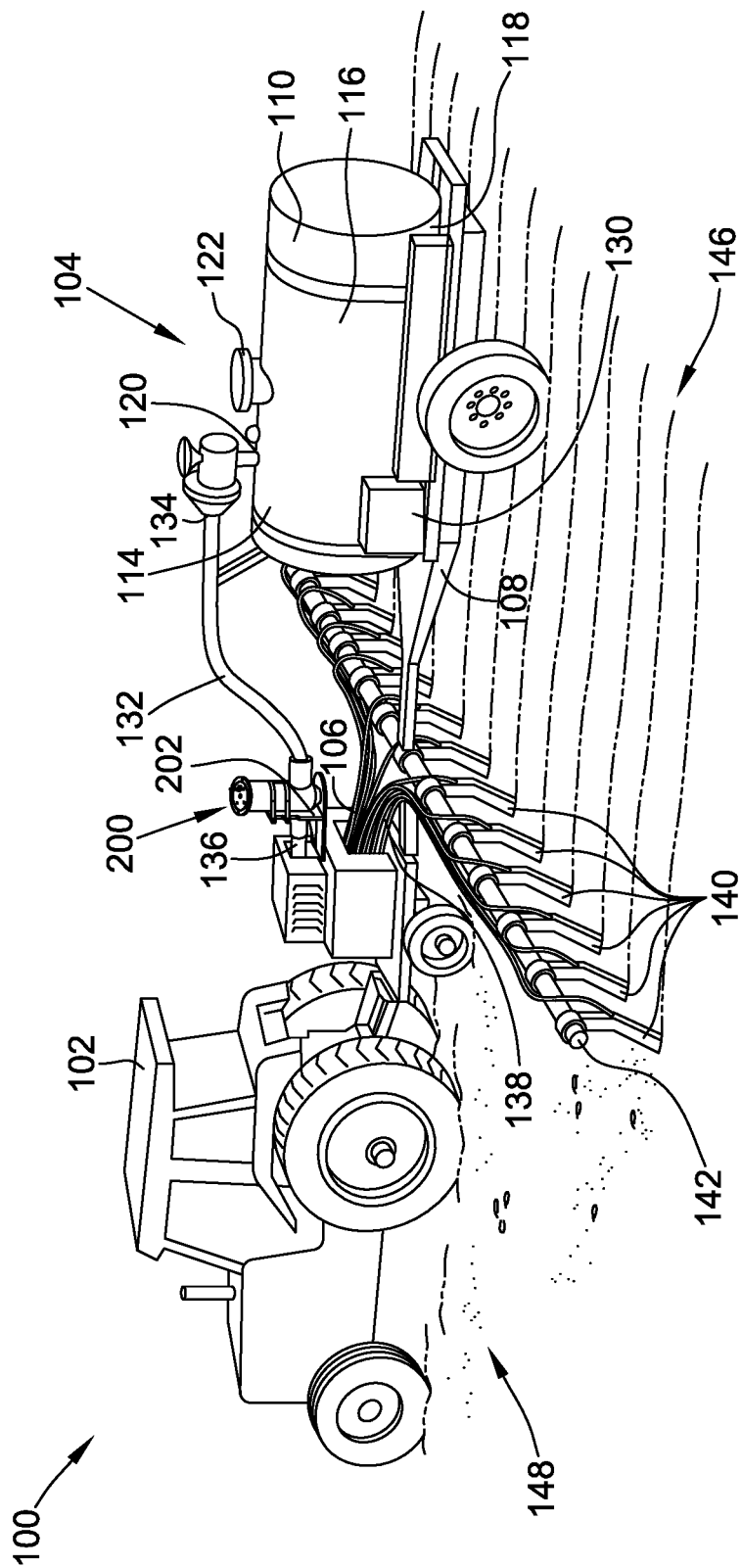
FIG. 9 is a perspective view of a fluid application system.

FIG. 9 is a perspective view of one embodiment of a fluid application system 100. Fluid application system 100 includes a volatile liquid fertilizer application system for application of fertilizers such as, for example, anhydrous ammonia. Fluid application system 100 includes a motorized vehicle 102, a fluid storage tank 104, and a distribution manifold 106. Motorized vehicle 102 may be any machine that enables fluid application system 100 to function as described herein. In suitable embodiments, one or more components of fluid application system 100 may be incorporated into motorized vehicle 102 without departing from some aspects of this disclosure. In the exemplary embodiment, fluid storage tank 104 and distribution manifold 106 are disposed on a wheeled chassis 108 towed behind motorized vehicle 102.

During operation, fluid storage tank 104 may contain any type of fluid for distribution by fluid application system 100. For example, fluid storage tank 104 may store a volatile fluid intended to be applied to fields for agricultural purposes. A common fluid used for agricultural purposes is anhydrous ammonia, which is applied to fields primarily as a fertilizer to increase the nutrient level of soils. The anhydrous ammonia includes at least some gaseous substance and, therefore, is maintained at a carefully controlled pressure to control the gaseous properties. In the exemplary embodiment, fluid storage tank 104 is configured to store and maintain the fluid at a desired pressure as fluid flows out of the fluid storage tank. Fluid application system 100 includes at least one pump 130 connected to fluid storage tank 104 to facilitate maintaining the fluid in the fluid storage tank at the desired pressure. In alternative embodiments, where the fluid is a volatile fluid, such as anhydrous ammonia, pump 130 may be omitted.

In the exemplary embodiment, fluid storage tank 104 is fluidly connected to a distribution manifold 106 by a fluid line 132. Disposed between distribution manifold 106 and fluid storage tank 104 is a valve 136 and quick connect 134. In suitable embodiments, quick connect 134 and valve 136 may be coupled to any portions of fluid application system 100. For example, in some suitable embodiments, any of quick connect 134 and valve 136 may be omitted without departing from some aspects of this disclosure. In the exemplary embodiment, quick connect 134 facilitates fluid storage tank 104 being connected to and removed from fluid line 132. Valve 136 controls fluid flow through fluid line 132. For example, valve 136 is positionable between a closed position where fluid is inhibited from flowing through fluid line 132 and an open position where fluid is allowed to flow through fluid line 132. In certain embodiments, valve 136 may be any valve that enables fluid application system 100 to function as described herein.

Figure 10:
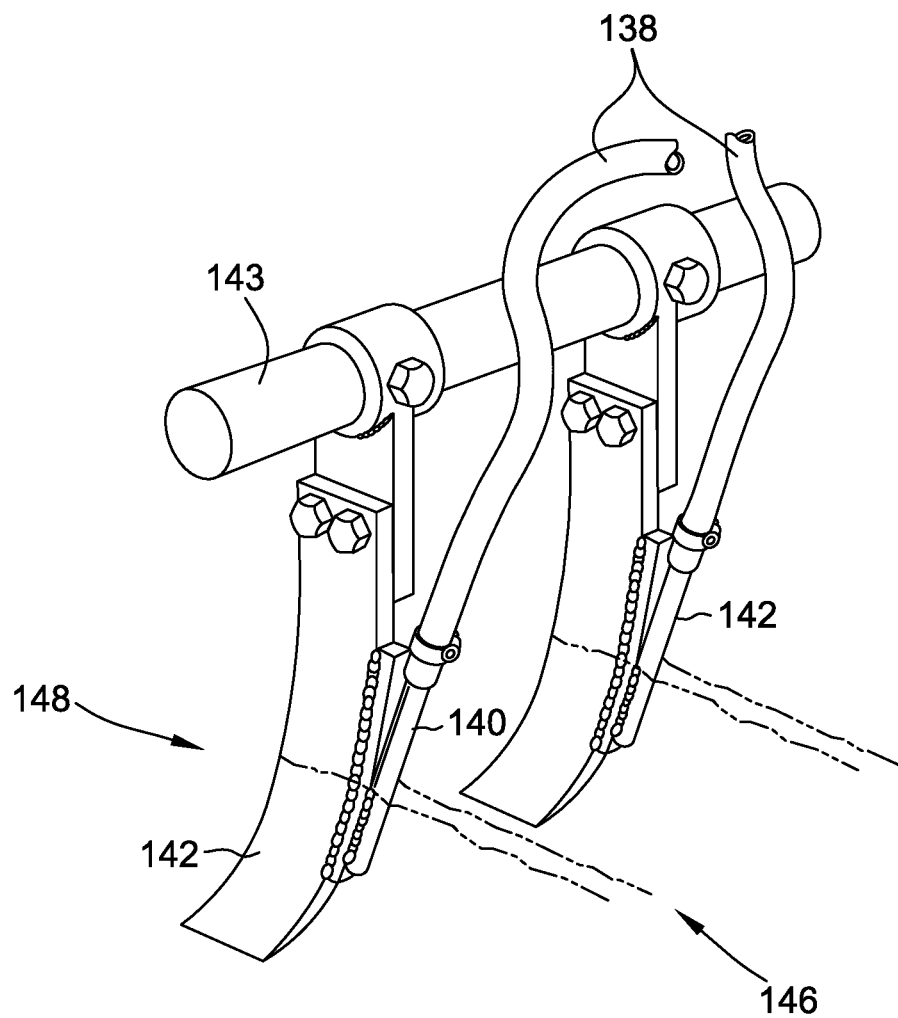
FIG. 10 is a perspective view of a portion of the fluid application system shown in FIG. 7.

The fluid is directed from fluid line 132 through valve 136 and into distribution manifold 106. As shown in FIGS. 9 and 10, distribution manifold 106 includes a plurality of supply lines 138 each connected to valve assemblies 36. Each valve assembly 36 regulates flow of the fluid into a dispensing tube 140 for injecting the fluid into a soil. Distribution manifold 106 distributes the fluid to valve assemblies 36 and dispensing tubes 140 for emitting the fluid from fluid application system 100.

Each valve assembly 36 is controlled by a controller, such as controller 506 (shown in FIG. 5). The controller may be configured to control flow through dispensing tubes 140 using the methods described above with reference to FIGS. 3A-8.

In suitable embodiments, fluid application system 100 may include any number of dispensing tubes 140. In some embodiments, as the fluid is emitted from dispensing tubes 140, vehicle 102 moves fluid application system 100 along a desired path for fluid application, such as rows 146 of a field 148. In the exemplary embodiment, dispensing tubes 140 are connected to or positioned behind a soil preparation mechanism 142, such as a knife or plow that contacts the soil as dispensing tubes 140 dispense fluid onto the soil, as best seen in FIG. 10. Soil preparation mechanisms 142 are connected to a boom 143, which is connected to and pulled behind vehicle 102.

Figure 11:
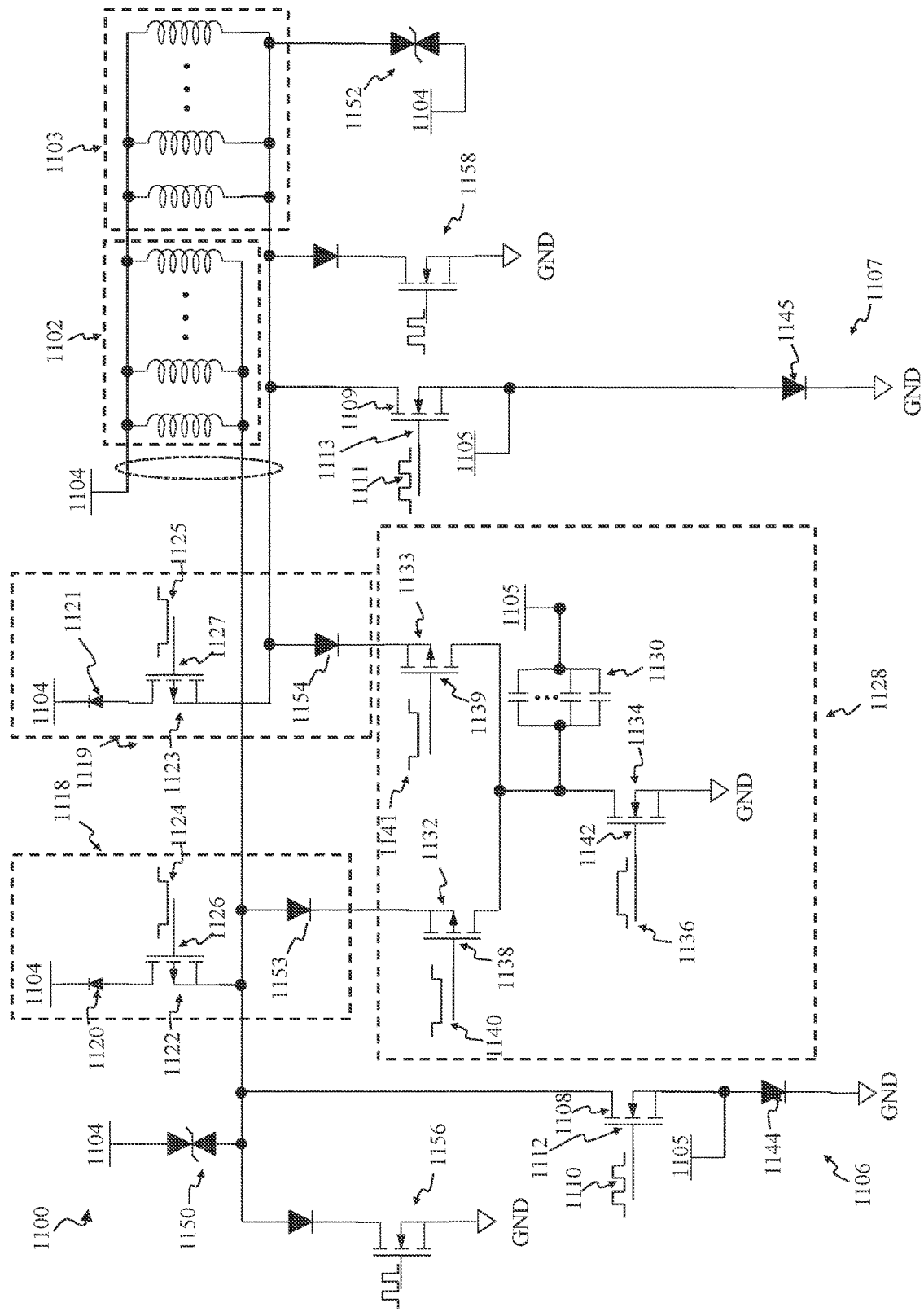
FIG. 11 is a schematic diagram of a drive circuit for use in driving solenoid valves, such as the valve assembly shown in FIG. 3.

FIG. 11 is a schematic diagram of a drive circuit 1100 for use in operating a group of solenoids or solenoid valves, such as, for example, solenoid valve 300, shown in FIG. 3. The group of solenoid valves may be a single valve or multiple valves ganged together. As in drive circuits 400, 500, and 700 described above, drive circuit 1100 is configured to operate one or more valves or groups of valves (not shown) by generating a current signal, or waveform, for energizing respective solenoid coils of the one or more valves, or groups of valves. The valves and, more specifically, their respective solenoid coils 1102 and 1103 are supplied a coil voltage from a bussed coil voltage supply 1104, and respective ground paths 1106 and 1107 for the one or more valves. Generally, when the ground path is closed, the solenoid coils conduct coil currents from supply to GND. For example, a first group of solenoid coils 1102 conducts coil current from bussed coil voltage supply 1104 to GND through ground path 1106.

Bussed coil voltage supply 1104 is a shared power supply for all of the valves and, more specifically, solenoid coils 1102 and 1103. Bussed coil voltage supply 1104, in certain embodiments, utilizes a single conductor to supply power to each valve on, for example, spray system 10. Accordingly, each individual valve or group of valves needs only one additional dedicated conductor to provide a switched ground path, such as ground paths 1106 and 1107, greatly reducing the size and expense of wiring and harnesses for spray system 10.

Ground paths 1106 and 1107 include FETs 1108 and 1109, respectively, that regulate coil current through solenoid coils 1102 and 1103. Ground path 1106 for solenoid coils 1102 includes FET 1108 controlled by a gate signal 1110 applied to a gate 1112 of FET 1108. In certain embodiments, as shown in FIG. 5, one or more bipolar TVS diodes 1150 and 1152 coupled in series, in parallel, or a combination of series and parallel diodes, may be included in parallel with each of solenoid coils 1102 and 1103, and FET 1108 is capable of withstanding the excessive drain-source voltages that may occur when solenoid coils 1102 and 1103 are de-energized. Ground path 1107 operates in the same manner as ground path 1106, but generally out of phase with ground path 1106 in order to offset in time the actuation of the first and second groups of valves corresponding to solenoid coils 1102 and 1103. More specifically, ground path 1107 for solenoid coils 1103 includes FET 1109 controlled by a gate signal 1111 applied to a gate 1113 of FET 1109.

In an alternative embodiment, the ground path for solenoid coils 1102 includes a direct path to ground through a FET 1156. Likewise, the ground path for solenoid coils 1103 includes a direct path to ground through a FET 1158.

Generally, gate signals 1110 and 1111 are logic level signals generated by a gate driving circuit or, for example, controller 506 (shown in FIG. 5). In certain embodiments, gate signals 1110 and 1111 are pulse-width modulated (PWM) with a certain duty cycle and at a certain frequency to supply a desired amount of current to solenoid coils 1102 and 1103. For example, a 100% duty cycle gate signal 1110 may be applied to gate 1112 to transition the solenoid valve from a closed position to an opened position, i.e., to translate the poppet from the closed position to the opened position. A 0% duty cycle gate signal 1110 is applied to gate 1112 (or gate signal 1110 is removed entirely) to transition the solenoid valve from the opened position to the closed position. Further, gate signals 1110 and 1111 may be modulated to a high frequency and a low duty cycle when the solenoid valve is being held in the opened position after transitioning from the closed position. In certain embodiments, when the solenoid valve is being held in the closed position, gate signals 1110 and 1111 may be modulated to a low frequency and low duty cycle to maintain a level of coil current above zero, but below the threshold at which the valve poppet would translate from the closed position to the opened position, thereby improving responsiveness of the valve to an "open" command.

Drive circuit 1100 includes a charge pump circuit 1128. Charge pump circuit 1128 includes a capacitor bank 1130 that is charged and discharged by selectively changing the ground reference for capacitor bank 1130. Referencing capacitor bank 1130 is controlled by FET 1134. Charging (i.e., coupling of capacitor bank 1130 to solenoid coils 1102 and/or 1103 through feed diodes 1153 or 1154) is controlled by FETs 1132 and 1133. More specifically, capacitor bank 1130 is charged by coil currents from the first or second groups of solenoid valves corresponding to solenoid coils 1102 and 1103, respectively, by opening FET 1134 and selectively closing either FET 1132 or FET 1133, or both simultaneously, to direct coil currents to capacitor bank 1130 from either solenoid coils 1102 or 1103 and through feed diodes 1153 or 1154, respectively. Likewise, capacitor bank 1130 is discharged via charge pump bus 1105 by closing FET 1134, and closing one or both of FET 1108 or FET 1109 to select which group of solenoid coils the charging current is discharged through. For example, once charged to a high voltage, the charge on capacitor bank 1130 becomes highly negative when a positive node of capacitor bank 1130 is referenced to GND through FET 1134. Accordingly, charge pump bus 1105, which is highly negative, may be coupled in series between solenoid coils 1102 or 1103 and GND such that the voltage applied across solenoid coils 1102 or 1103 is a difference between the voltage on bussed coil voltage supply 1104 and the negative potential of charge pump bus 1105, effectively supplying the summed voltage of both bussed coil voltage supply 1104 and capacitor bank 1130 momentarily to solenoid coils 1102 or 1103.

FETs 1132 and 1133, in the embodiment of FIG. 11, are illustrated as P-FET devices, although, in alternative embodiments, FETs 1132 and 1133 may be implemented with N-FET devices or other suitable switching devices. Likewise, FET 1134 is illustrated as an N-FET, but could be implemented with a P-FET or other suitable switching device in alternative embodiments. Likewise, drive circuit 1100 can be implemented to generate a large negative voltage or a large positive voltage to drive solenoid coils 1102 and 1103.

FETs 1132 and 1133 are operated by respective charge signals 1140 and 1141 applied to corresponding gates 1138 and 1139 of FETs 1132 and 1133. Similarly, FET 1134 is operated by a discharge signal 1136 applied to a gate 1142 of FET 1134. Discharge signal 1136 and charge signals 1140 and 1141, in certain embodiments, may be logic-level signals generated by, for example, controller 506. In alternative embodiments, discharge signal 1136 and charge signals 1140 and 1141 are generated by one or more driver circuits (not shown) to protect other components such as optoisolators, among others.

Generally, when FET 1134 is closed, FETs 1132 and 1133 are opened to avoid shorting the supply voltage to GND. However, because capacitor bank 1130 is charged through solenoid coils 1102 or 1103, the inherent impedance of solenoid coils 1102 or 1103 prevents such a short circuit. Moreover, because there is also a depleted capacitor needing to be charged, the coils function as a ballast resistor when the depleted capacitor is reconnected to power through the coils. That improves the lifecycle. The depleted capacitors will otherwise charge very quickly, functioning like a short to rail, which can overheat the capacitors, reduce life cycle, or otherwise damage the capacitors or wiring. FETS 1132 and 1133 are also opened to prevent current from being conducted through solenoid coils 1102 or 1103 when the valves should not be opened, and when, for example, FET 1134 is closed or when capacitor bank 1130 is discharged and in need of charging while solenoid coils 1102 or 1103 should not be energized. Further, in certain embodiments, with FETs 1132 and 1133 opened and FET 1134 closed, capacitor bank 1130 is coupled in parallel with a diode 1144. Diode 1144 is a low forward voltage diode, such as a Schottky diode or a germanium diode. Diode 1144 blocks current sourced from capacitor bank 1130 from conducting directly to GND. Accordingly, bussed coil voltage supply 1104 and the negative potential across capacitor bank 1130 momentarily add together and are applied across solenoid coils 1102 or 1103 when transitioning the solenoid valves from the closed position to the opened position. The resulting re-referencing and higher-voltage applied to solenoid coils 1102 or 1103 produces a larger rate-of-change of current, (di/dt), conducted through each of solenoid coils 1102 or 1103, further resulting in a faster opening time by more quickly achieving a sufficient coil current to overcome the closing force on the poppet and translate the poppet from the closed position to the opened position. In certain embodiments, the combined voltage of bussed coil voltage supply 1104 and capacitor bank 1130 is applied immediately when gate signal 1110 initiates opening of the valve.

In other embodiments, only the voltage on bussed coil voltage supply 1104 is applied initially, and the combined voltage of bussed coil voltage supply 1104 and capacitor bank 1130 is applied one or more milliseconds later. In certain embodiments, capacitor bank 1130 may be discharged for 4 to 6 milliseconds. In other embodiments, capacitor bank 1130 is discharged for 10 to 20 milliseconds. Moreover, capacitor bank 1130 may be discharged at differing times for either of the first and second groups of solenoid coils 1102 and 1103 during the translation of the respective poppet from the closed position to the opened position based on the goals of a particular embodiment of drive circuit 1100. In some embodiments, capacitor bank 1130 may be discharged for 20 milliseconds or more. Generally, the time necessary to translate the poppet from the closed position to the opened position varies, for example, for different sizes of valves, different solenoid coils, different operating voltage levels, fluid viscosity, and different operating fluid pressure levels across the one or more solenoid valves.

Once the poppet (or poppets) has translated to the opened position, FET 1134 may be opened to enable capacitor bank 1130 to be charged when either of FET 1132 or FET 1133 is subsequently closed. Generally, capacitor bank 1130 may be charged at any time other than when discharging. For example, in certain embodiments, either FET 1132 or FET 1133 is closed to begin charging of capacitor bank 1130 when the one or more solenoid valves corresponding to solenoid coils 1102 or 1103 are being held in the opened position. In alternative embodiments, capacitor bank 1130 may be charged during flyback when solenoid coils 1102 or 1103 are de-energizing to close the one or more solenoid valves. For example, capacitor bank 1130 may be charged by closing FET 1132 or FET 1133 when solenoid coils 1102 or 1103, respectively, are de-energizing, for example, during the "off" periods of the high-frequency PWM gate signal 1110 or 1111. For example, when gate signal 1110 is pulsed at 200 hertz and 50% duty cycle, FET 1132 may then be closed during the "off" periods of gate signal 1110. Alternatively, FET 1132 and FET 1133 may remain open when de-energizing solenoid coils 1102 or 1103, resulting in flyback current being forced through bipolar TVS diodes 1150 or 1152.

Drive circuit 1100 includes flyback circuits 1118 and 1119 that slow the decay of current through solenoid coil 1102 and 1103 when switched off at a high frequency by FETs 1108 and 1109. By slowing the decay, flyback circuit 1118 and 1119 each enables the coil current to remain substantially constant, and above a threshold at which the corresponding valves would close, when switching FET 1108 or FET 1109 at a high frequency, e.g., when the valves are being held in the opened position by a high frequency PWM gate signal 1110 or 1111. Flyback circuit 1118 includes a diode 1120 that preferably has a low forward voltage, such as a silicon or germanium diode, or a Schottky diode. Generally, the speed at which solenoid coils 1102 discharge their stored energy is directly related to the voltage drop across them, which is further a function of the back EMF. Accordingly, the lower the forward voltage of diode 1120, the lower the voltage drop across solenoid coils 1102, and the slower energy is dissipated from solenoid coils 1102. Flyback circuit 1118 further includes a FET 1122 that enables and disables flyback circuit 1118 by closing and opening the "free-wheeling" path for the coil current to dissipate through diode 1120. FET 1122 is controlled by a gate signal 1124 applied to a gate 1126 of FET 1122. Gate signal 1124 is supplied by a controller, such as, for example, controller 506, or the controller that operates FET 1108 using gate signal 1110, described above. In an alternative embodiment, flyback circuit 1118 may include a thyristor in place of FET 1122 and diode 1120. In such an embodiment, the thyristor is controlled by gate signal 1124 in a manner similar to the control of FET 1122. Likewise, flyback circuit 1119 includes a diode 1121 that preferably has a low forward voltage, such as a silicon or germanium diode, or a Schottky diode. Generally, the speed at which solenoid coils 1103 discharge their stored energy is directly related to the voltage drop across them, which is further a function of the back EMF. Accordingly, the lower the forward voltage of diode 1121, the lower the voltage drop across solenoid coils 1103, and the slower energy is dissipated from solenoid coils 1103. Flyback circuit 1119 further includes a FET 1123 that enables and disables flyback circuit 1119 by closing and opening the "free-wheeling" path for the coil current to dissipate through diode 1121. FET 1123 is controlled by a gate signal 1125 applied to a gate 1127 of FET 1123. Gate signal 1125 is supplied by a controller, such as, for example, controller 506, or the controller that operates FET 1109 using gate signal 1111, described above.

While enabled, flyback circuits 1118 and 1119 and, more specifically, diodes 1120 and 1121 slow the decay of the coil currents from solenoid coils 1102 and 1103, further enabling the reduction of the duty cycle of current supplied to solenoid coil 1102 and 1103, i.e., the duty cycle of gate signals 1110 and 1111. In certain embodiments, the duty cycle is reduced to below 25%. In other embodiments, the duty cycle may be reduced, but still at 50% or above. In certain embodiments, for example, the duty cycle is reduced to below 80%. Likewise, flyback circuits 1118 and 1119 are disabled when the coil current should dissipate quickly, such as when the valve is to be closed, or when capacitor bank 1130 is to be charged. Generally, flyback circuits 1118 and 1119 may be enabled or disabled when transitioning the valves from the closed position to the opened position using a 100% duty cycle gate signal 1110 or 1111, because solenoid coil 1102 or 1103 are charging and FETs 1108 and 1109 provide respective low-impedance paths to GND.

In the embodiment of FIG. 11, FET 1108 and FET 1109 operate with a high frequency PWM signal, for example, when one of the corresponding valves or groups of valves are being held in an opened position while the capacitor bank 1130 is being used by another group of valves, or when the charged voltage of capacitors 1130 has reach a maximum voltage. In an alternative embodiment, drive circuit 1100 may be used in operating a single solenoid or solenoid valve, such as, for example, solenoid valve 300, shown in FIG. 3. Further, one or more components of drive circuit 1100 may be duplicated to operate a plurality of solenoids or solenoid valves individually. Drive circuit 1100 otherwise operates in the same manner as described above with respect to FIG. 11.

Figure 12:
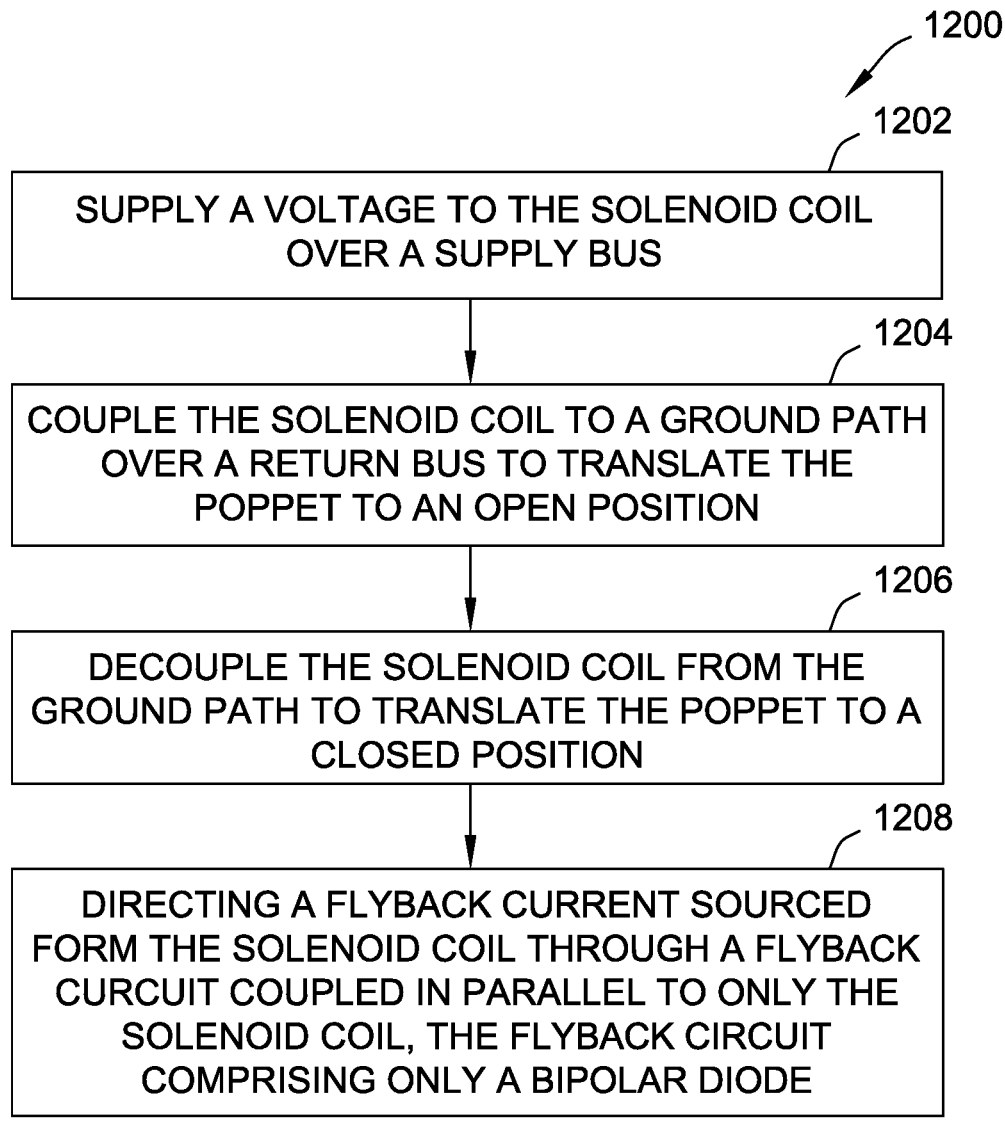
FIG. 12 is a flow chart of an example method of controlling a solenoid valve.

FIG. 12 is a flow diagram of an example method 1200 of controlling one or more solenoid valves having respective solenoid coils, such as solenoid coils 1102 or 1103 (shown in FIG. 11) and poppets, such as poppet 312 of valve 300 (shown in FIG. 3). Referring to drive circuit 1100 of FIG. 11, method 1200 includes supplying 1202 a voltage to one or more solenoid coils 1102 or 1103 over a supply bus, such as bussed coil voltage supply 1104. Each solenoid coil is coupled 1204 to a ground path, such as ground paths 1106 or 1107, which provide a return bus for the valve or group of valves to translate their respective poppets to opened position. Each solenoid coil is decoupled 1206 from ground paths 1106 or 1107 to translate their respective poppets to the closed position. When solenoid coils 1102 or 1103 are decoupled from ground, a flyback current results, sourced from solenoid coils 1102 or 1103 and directed through a flyback circuit local to each valve and coupled in parallel to each solenoid coil. The flyback circuit (shown in FIG. 5) includes only bipolar TVS diode 502.

In certain embodiments, coupling 1204 and decoupling 1206 includes closing and opening semiconductor devices such as FETs 1108 and 1109 coupled between solenoid coils 1102 and 1103 and ground paths 1106 and 1107.

In certain embodiments, FETs 1108 and 1109 are designed to withstand, or have a voltage rating of, at least a bus voltage for bussed coil voltage supply 1104 plus a reverse breakdown voltage of the bipolar diode.

The technical effects of the systems, apparatus, and methods described herein include: (a) reducing turn-on time and turn-off time for solenoid valves; (b) providing a high voltage bus using solenoid coils that are environmentally sealed, isolated from control electronics, have relatively large inductance, and have sufficient power capacity for boost converting without any additional cost, size, or weight; (c) charging the high voltage bus using a charge pump circuit having a shared bank of capacitors; (d) charging the bank of capacitors selectively using coil currents from any one group or phase of solenoid coils; (e) bussing coil voltage supply together for multiple valves or groups of valves; (f) reducing wiring and harnessing necessary to supply power to and control multiple valves or groups of valves; (g) reducing overall power consumption by regulating currents near closing thresholds; (h) reducing power dissipation within the drive circuit by the use of electromagnetic field energy stored in the solenoid coil and by utilizing the flyback currents to charge a high voltage bus and to charge capacitor banks for the charge pump circuit; (i) reducing power supply and ground loading through use of bipolar TVS diodes coupled in parallel with each solenoid coil; (j) dissipating flyback currents local to a given solenoid valve through use of the bipolar TVS diodes; and (k) enabling valves to operate with greater pressures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A drive circuit for controlling a solenoid valve having a solenoid coil and a poppet configured to translate therein, said drive circuit comprising:
   a supply bus configured to couple the solenoid coil to a power supply and supply a coil current;
   a return bus configured to provide a ground path for the coil current;
   a flyback circuit coupled in parallel to only the solenoid coil, said flyback circuit comprising only a bipolar diode;
   a switch coupled in series with the solenoid coil and configured to couple and decouple the solenoid coil to said return bus; and
   a charge pump circuit having at least one capacitor, said charge pump circuit configured to charge said at least one capacitor using the coil current through the solenoid valve,
   wherein said charge pump circuit is further configured to momentarily change a reference of said at least one capacitor coupled in series with the solenoid coil to boost a voltage applied across the solenoid coil when said switch is opened in order to accelerate a decrease in the coil current through the solenoid coil.

2. The drive circuit of claim 1, wherein said switch comprises a semiconductor device having drain-source voltage rating of at least a bus voltage for said supply bus plus a reverse breakdown voltage of said bipolar diode.

3. The drive circuit of claim 1 wherein said charge pump circuit is further configured to momentarily change the reference of said at least one capacitor coupled in series with the solenoid coil to boost the voltage applied across the solenoid coil and accelerate an increase in the coil current through the solenoid coil when said switch is closed.

4. The drive circuit of claim 3, wherein said charge pump circuit further comprises:
   a field effect transistor (FET) coupled to said at least one capacitor and configured to selectively reference said at least one capacitor to the ground path or open circuit; and
   a control circuit configured to:
      open said FET to reference said at least one capacitor to open circuit to discharge the solenoid coil through said bipolar diode.

5. The drive circuit of claim 4, wherein said control circuit is further configured to couple said at least one capacitor to said flyback circuit to charge said at least one capacitor.

6. The drive circuit of claim 3, wherein said charge pump circuit is further configured to couple said at least one capacitor in series with another solenoid coil to boost a voltage applied across said another solenoid coil.

7. The drive circuit of claim 1, wherein said bipolar diode comprises a bipolar transient voltage suppression diode.

8. A drive circuit for controlling a plurality of solenoid valves having respective solenoid coils and respective poppets configured to translate therein, said drive circuit comprising:
   a supply bus configured to couple the respective solenoid coils to a power supply and supply respective coil currents;
   respective return buses configured to provide a ground path for the respective coil currents;
   respective bipolar diodes coupled in parallel to the respective solenoid coils;
   respective switches coupled in series with the respective solenoid coils and configured to couple and decouple the respective solenoid coils to said respective return buses; and
   a charge pump circuit having a bank of capacitors, said charge pump circuit configured to charge said bank of capacitors using one or more of the respective coil currents through one or more of the respective solenoid valves,
   wherein said charge pump circuit is further configured to momentarily change a reference of said bank of capacitors coupled in series with the respective solenoid coils to boost a voltage applied across the respective solenoid coils when said respective switches are opened in order to accelerate a decrease in the respective coil currents through the respective solenoid valves.

9. The drive circuit of claim 8 wherein said charge pump circuit is further configured to momentarily change the reference of said bank of capacitors coupled in series with the respective solenoid coils to boost the voltage applied across the respective solenoid coils and accelerate an increase in the respective coil currents through the respective solenoid valves when said respective switches are closed.

10. The drive circuit of claim 9, wherein said charge pump circuit further comprises:
    a field effect transistor (FET) coupled to said bank of capacitors and configured to selectively reference said bank of capacitors to the ground path or open circuit; and
    a control circuit configured to:
       open said FET to reference said bank of capacitors to open circuit to discharge the respective solenoid coils through said respective bipolar diodes.

11. The drive circuit of claim 9, wherein the plurality of solenoid valves comprises a first group of valves controlled out of phase with respect to a second group of valves, wherein said respective switches for said first group of valves are synchronized to open and close together, and wherein said respective switches for said second group of valves are synchronized to open and close together.

12. The drive circuit of claim 11 further comprising a plurality of switches configured to couple said bank of capacitors for said charge pump circuit to the respective solenoid coils for said first group of valves and for said second group of valves to charge said bank of capacitors through the respective solenoid coils.

13. The drive circuit of claim 11, wherein said first group of valves comprises only one solenoid valve, and wherein said second group of valves comprises only one other solenoid valve.

14. The drive circuit of claim 8, wherein said respective switches each comprise a semiconductor device having drain-source voltage rating of at least a bus voltage for said supply bus plus a reverse breakdown voltage of said respective bipolar diodes.

15. A method of controlling a solenoid valve having a solenoid coil and a poppet configured to translate therein, said method comprising:
supplying a voltage to the solenoid coil over a supply bus;
coupling the solenoid coil to a ground path over a return bus to translate the poppet to an opened position;
decoupling the solenoid coil from the ground path to translate the poppet to a closed position;
directing a flyback current sourced from the solenoid coil through a flyback circuit coupled in parallel to only the solenoid coil, the flyback circuit comprising only a bipolar diode;
charging a capacitor of a charge pump circuit using a coil current conducted through the solenoid coil; and
momentarily changing a reference of the capacitor coupled in series with the solenoid coil to boost a voltage applied across the solenoid coil when the solenoid coil is decoupled from the ground path in order to accelerate a translation of the poppet to the closed position.

16. The method of claim 15, wherein coupling and decoupling the solenoid coil comprises closing and opening a semiconductor device coupled between the solenoid coil and the ground path.

17. The method of claim 16, wherein the semiconductor device has a drain-source voltage rating of at least a bus voltage for the supply bus plus a reverse breakdown voltage of the bipolar diode.

18. The method of claim 15 further comprising:
momentarily changing the reference of the capacitor coupled in series with the solenoid coil to boost the voltage applied across the solenoid coil and accelerate a translation of the poppet to the opened position when the solenoid coil is coupled to the ground path.

19. The method of claim 18, wherein momentarily changing the reference of the capacitor comprises:
commutating a field effect transistor (FET) coupled to a positive pole of the capacitor and configured to selectively reference the capacitor to the ground path.

20. The method of claim 18, wherein charging the capacitor comprises:
closing at least one FET to couple the solenoid coil to the capacitor.

21. A drive circuit for controlling a first solenoid valve having a first solenoid coil and a second solenoid valve having a second solenoid coil, said drive circuit comprising:
a low voltage bus configured to be energized by a power source;
a high voltage bus;
a control circuit coupled to said low voltage bus and said high voltage bus, and configured to:
selectively couple said low voltage bus and said high voltage bus to the first and second solenoid coils using a shared power bus; and
periodically energize each of the first and second solenoid coils using respective pulse-width-modulated (PWM) signals, each having a frequency and a duty cycle configured to regulate a current conducted through the corresponding solenoid coil;
a flyback circuit coupled to the first and second solenoid coils and configured to energize said high voltage bus with energy stored in the first and second solenoid coils; and
a charge pump circuit comprising a capacitor bank and a plurality of semiconductor switches, said plurality of semiconductor switches configured to couple said capacitor bank to the first solenoid coil or the second solenoid coil to charge said capacitor bank using the current conducted through the first solenoid coil or the second solenoid coil.

\* \* \* \* \*